(12) United States Patent
Ohno et al.

(10) Patent No.: US 7,871,688 B2
(45) Date of Patent: Jan. 18, 2011

(54) HONEYCOMB STRUCTURE AND METHOD OF MANUFACTURING THE HONEYCOMB STRUCTURE

(75) Inventors: Kazushige Ohno, Ibi-gun (JP); Masafumi Kunieda, Ibi-gun (JP); Masatoshi Okuda, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 0 days.

(21) Appl. No.: 12/107,631

(22) Filed: Apr. 22, 2008

(65) Prior Publication Data
US 2008/0286523 A1 Nov. 20, 2008

(30) Foreign Application Priority Data
May 14, 2007 (WO) .............. PCT/JP2007/059883

(51) Int. Cl.
*B32B 3/12* (2006.01)
*C04B 37/00* (2006.01)
*B01D 59/50* (2006.01)
(52) U.S. Cl. .................. 428/116; 156/89.22; 55/482
(58) Field of Classification Search .......... 428/116, 428/117, 118, 119; 55/482, 482.1, 483, 484, 55/485, 489, 502, 522, 523
See application file for complete search history.

(56) References Cited

U.S. PATENT DOCUMENTS

| | | | |
|---|---|---|---|
| 5,914,187 A | 6/1999 | Naruse et al. | |
| 6,669,751 B1 | 12/2003 | Ohno et al. | |
| 7,112,233 B2 | 9/2006 | Ohno et al. | |
| 7,309,370 B2 | 12/2007 | Kudo et al. | |
| 2003/0170160 A1* | 9/2003 | Morita et al. | 423/247 |
| 2004/0161596 A1 | 8/2004 | Taoka et al. | |
| 2005/0076627 A1* | 4/2005 | Itou et al. | 55/523 |
| 2005/0109023 A1 | 5/2005 | Kudo et al. | |
| 2005/0153099 A1 | 7/2005 | Yamada | |
| 2005/0160710 A1 | 7/2005 | Taoka et al. | |
| 2005/0161849 A1 | 7/2005 | Ohno et al. | |
| 2005/0169819 A1 | 8/2005 | Shibata | |
| 2005/0175514 A1 | 8/2005 | Ohno | |
| 2005/0178098 A1 | 8/2005 | Ono et al. | |
| 2005/0180898 A1 | 8/2005 | Yamada | |
| 2005/0229565 A1 | 10/2005 | Yoshida | |
| 2005/0247038 A1 | 11/2005 | Takahashi | |
| 2005/0272602 A1 | 12/2005 | Ninomiya | |
| 2006/0021310 A1 | 2/2006 | Ohno et al. | |
| 2006/0051556 A1* | 3/2006 | Ohno et al. | 428/116 |

(Continued)

FOREIGN PATENT DOCUMENTS

EP    1745848    1/2007

(Continued)

*Primary Examiner*—Gordon R Baldwin
(74) *Attorney, Agent, or Firm*—Ditthavong Mori & Steiner, P.C.

(57) ABSTRACT

A honeycomb structure includes a ceramic block formed by bonding a plurality of pillar-shaped honeycomb fired bodies by interposing an adhesive layer therebetween, and a sealing material layer provided on the periphery of the ceramic block. Each of the honeycomb fired bodies has a large number of cells disposed in parallel with one another in a longitudinal direction with a cell wall therebetween. The adhesive layer and the sealing material layer are integrally formed with substantially no interface to divide the two layers.

25 Claims, 11 Drawing Sheets

U.S. PATENT DOCUMENTS

| | | |
|---|---|---|
| 2006/0166820 A1 | 7/2006 | Ogyu et al. |
| 2006/0210765 A1 | 9/2006 | Ohno et al. |
| 2006/0213163 A1 | 9/2006 | Taoka et al. |
| 2006/0216466 A1 | 9/2006 | Yoshida |
| 2006/0216467 A1 | 9/2006 | Yoshida |
| 2006/0222812 A1 | 10/2006 | Koyama et al. |
| 2006/0225390 A1 | 10/2006 | Yoshida |
| 2006/0228521 A1 | 10/2006 | Ohno et al. |
| 2006/0230732 A1 | 10/2006 | Kunieda |
| 2006/0254231 A1 | 11/2006 | Hayashi et al. |
| 2007/0020155 A1 | 1/2007 | Ohno et al. |
| 2007/0028575 A1 | 2/2007 | Ohno et al. |
| 2007/0044444 A1 | 3/2007 | Oshimi |
| 2007/0065348 A1 | 3/2007 | Ohno et al. |
| 2007/0068128 A1 | 3/2007 | Oshimi et al. |
| 2007/0116908 A1 | 5/2007 | Ohno et al. |
| 2007/0126160 A1 | 6/2007 | Takahashi |
| 2007/0128405 A1 | 6/2007 | Sakaguchi et al. |
| 2007/0130897 A1 | 6/2007 | Sakaguchi et al. |
| 2007/0169453 A1 | 7/2007 | Hayakawa |
| 2007/0178275 A1 | 8/2007 | Takahashi |
| 2007/0190289 A1 | 8/2007 | Fujita |
| 2007/0190350 A1 | 8/2007 | Ohno et al. |
| 2007/0196620 A1 | 8/2007 | Ohno et al. |
| 2007/0204580 A1 | 9/2007 | Kunieda |
| 2007/0212517 A1 | 9/2007 | Ohno et al. |
| 2007/0293392 A1 | 12/2007 | Ohno et al. |
| 2008/0083202 A1 | 4/2008 | Kunieda et al. |
| 2008/0138567 A1 | 6/2008 | Ninomiya et al. |
| 2008/0202086 A1 | 8/2008 | Ohno et al. |
| 2008/0202087 A1 | 8/2008 | Ohno et al. |
| 2008/0203626 A1 | 8/2008 | Ohno et al. |
| 2008/0236394 A1 | 10/2008 | Ohno et al. |
| 2008/0237941 A1 | 10/2008 | Ohno et al. |
| 2008/0241501 A1 | 10/2008 | Ohno et al. |
| 2008/0286523 A1 | 11/2008 | Ohno et al. |

FOREIGN PATENT DOCUMENTS

| | | |
|---|---|---|
| JP | 2005-154202 | 6/2005 |
| WO | WO 2007/010643 | 1/2007 |
| WO | WO 2007/023653 | 3/2007 |

* cited by examiner

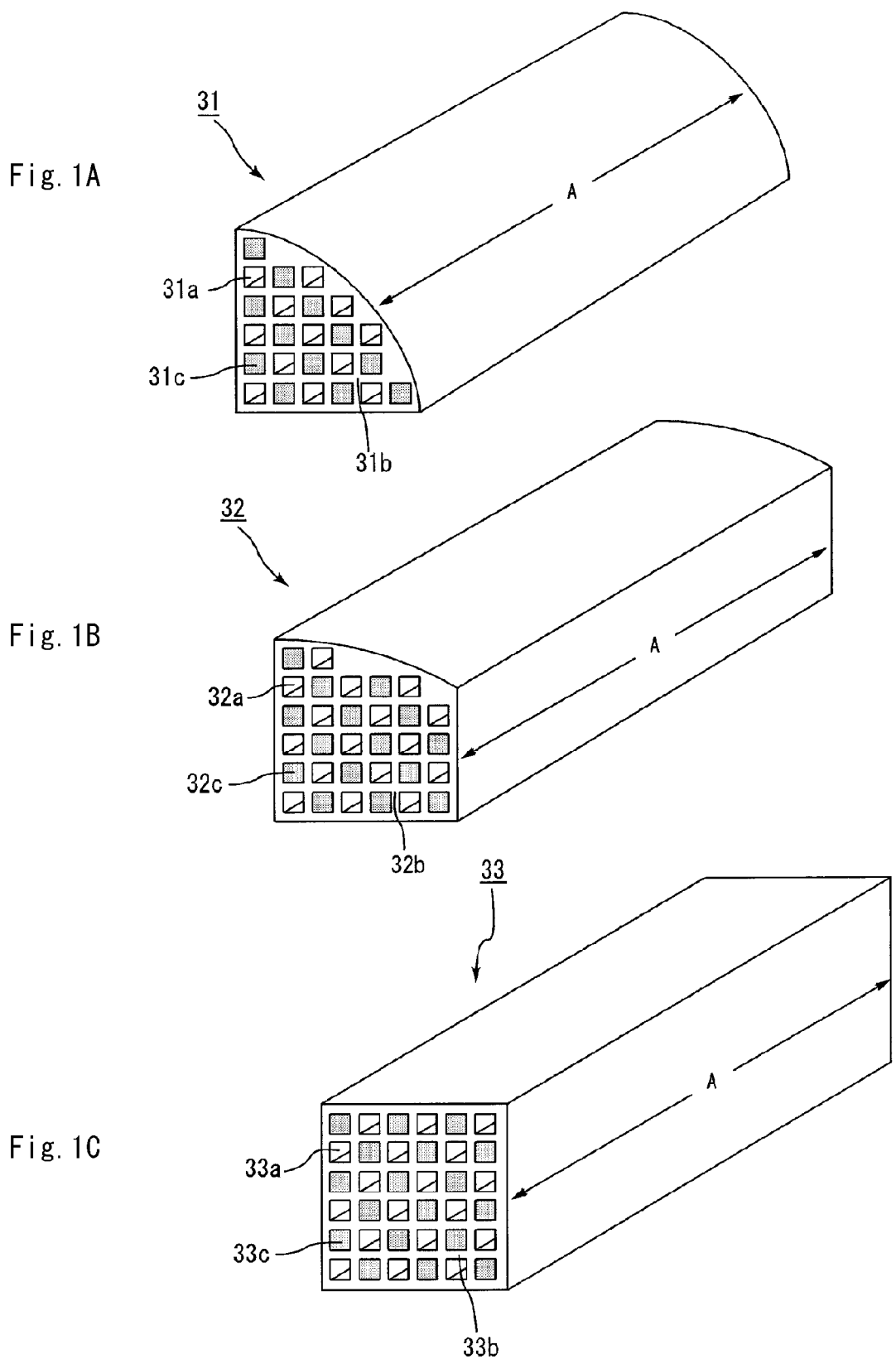

Fig. 2A
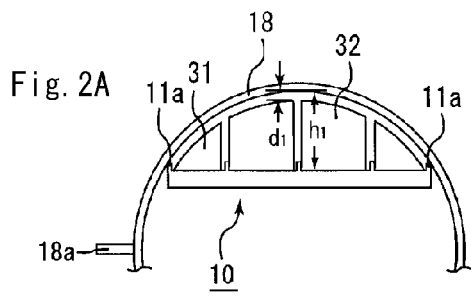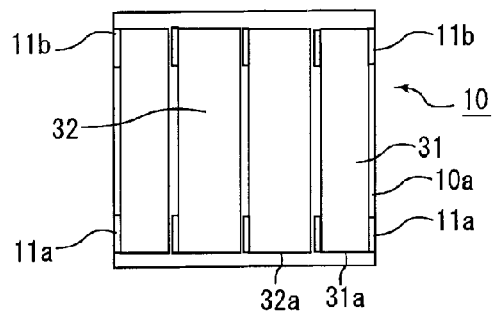
Fig. 2B
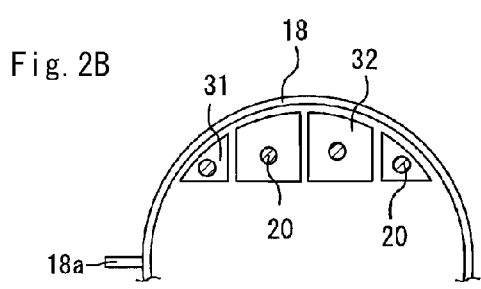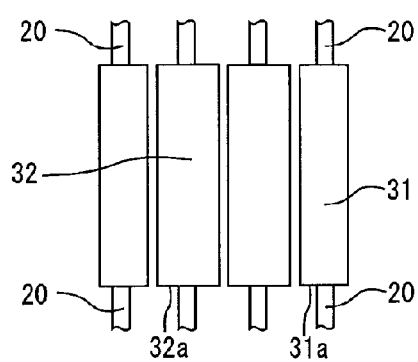
Fig. 2C
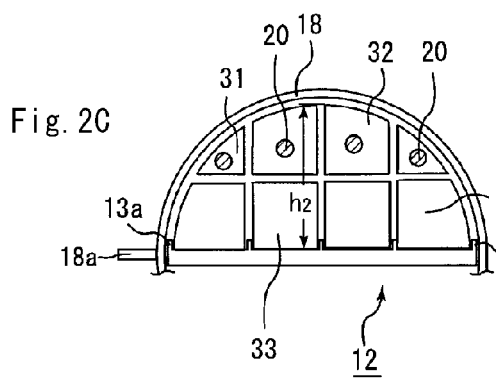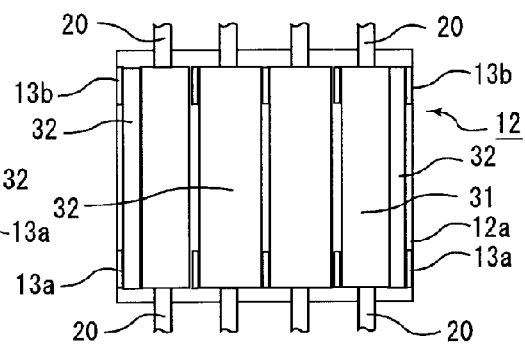
Fig. 2D
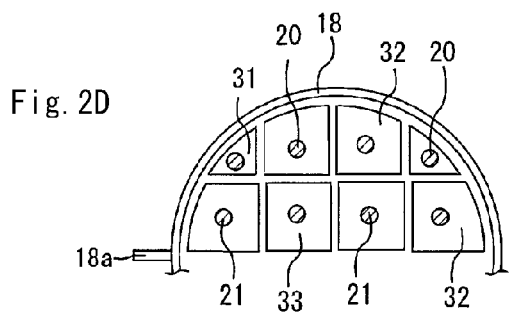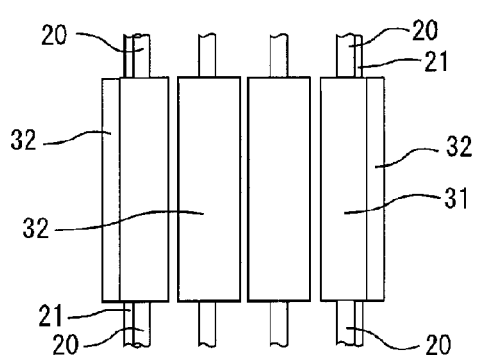

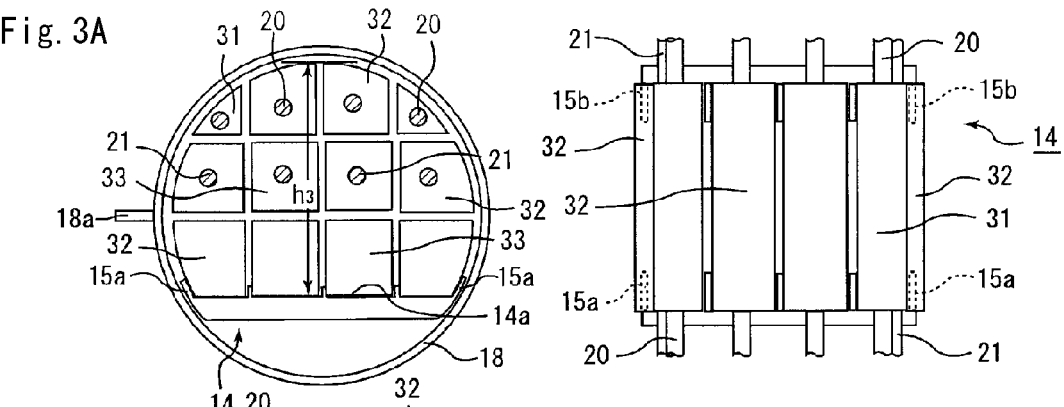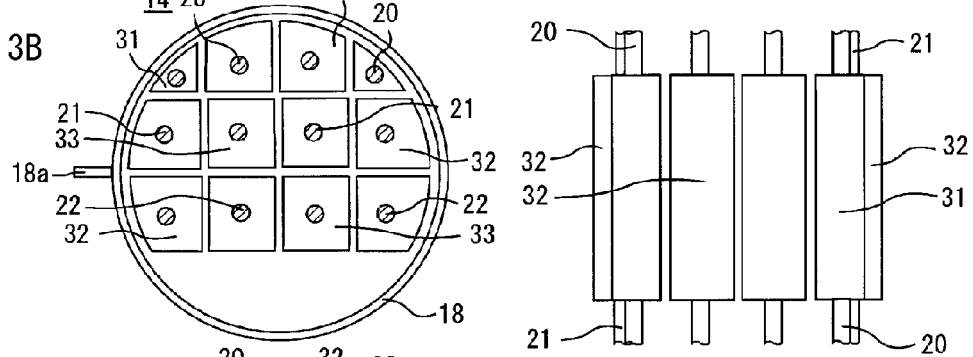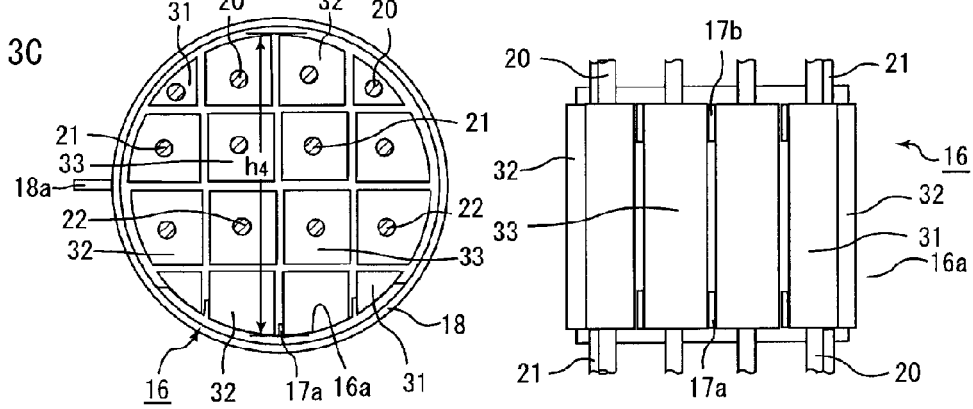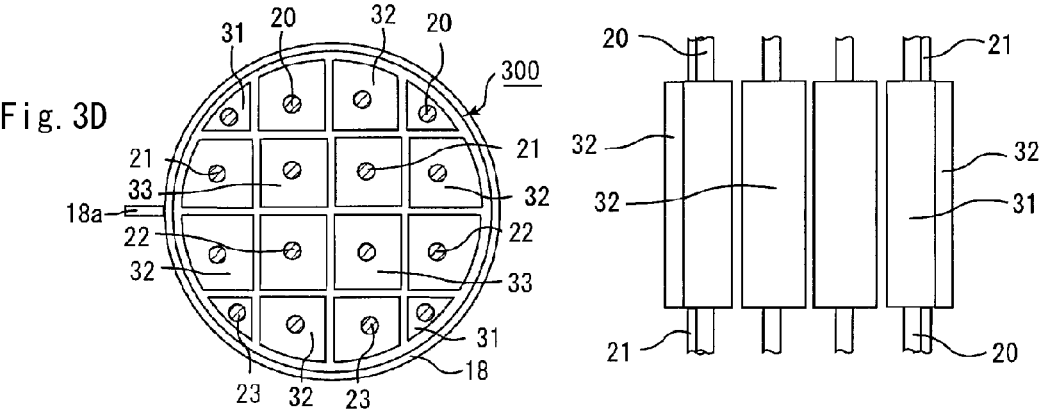

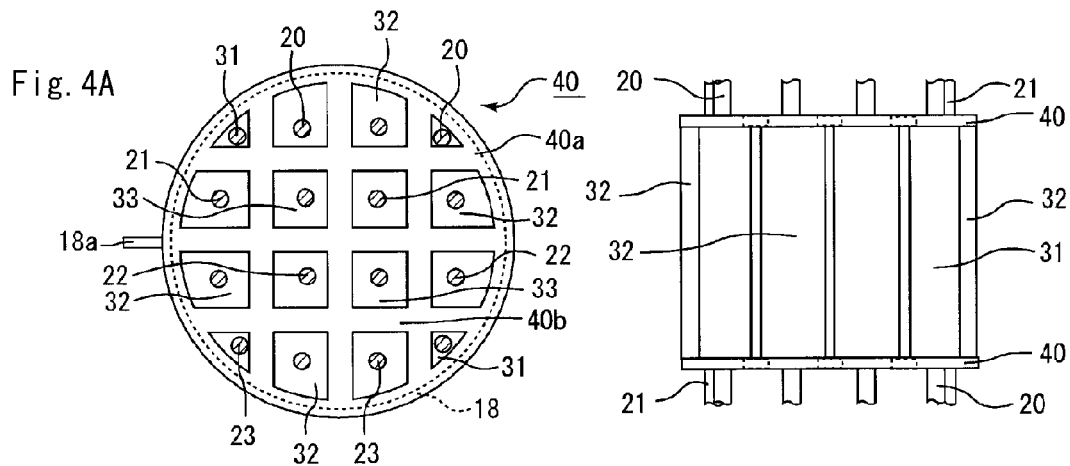
Fig. 4A
Fig. 4B
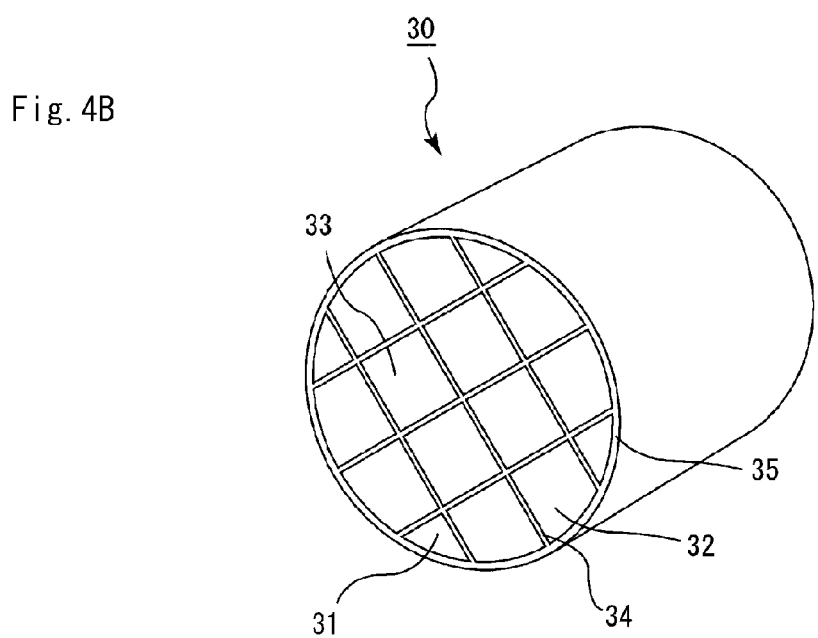

A-A line cross-sectional view 15.0kV ×100 YAGBSE 15.0kV ×500 YAGBSE

US 7,871,688 B2

HONEYCOMB STRUCTURE AND METHOD OF MANUFACTURING THE HONEYCOMB STRUCTURE

CROSS-REFERENCE TO RELATED APPLICATIONS

This present application claims priority under 35 U.S.C. §119 to PCT Application No. PCT/JP2007/059883, filed May 14, 2007, the contents of which are incorporated herein by reference in their entirety.

BACKGROUND OF THE INVENTION

1. Field of the Invention

The present invention relates to a honeycomb structure and a method of manufacturing the honeycomb structure.

1. Discussion of the Background

As a filter for purifying exhaust gases or as a catalyst carrier, there has been known an aggregated honeycomb structure which is formed by bonding a plurality of pillar-shaped honeycomb fired bodies each having a large number of cells provided in parallel with one another in a longitudinal direction (for example, see JP-A 2005-154202). In an aggregated honeycomb structure of this kind, adhesive layers are formed on side faces of each of honeycomb fired bodies, and those honeycomb fired bodies are bonded with the adhesive layers interposed therebetween to form a ceramic block, and further a sealing material layer is formed on the periphery of the ceramic block.

Upon the manufacture of the honeycomb structure of this kind, a plurality of the honeycomb fired bodies are bonded by using an adhesive paste, and the adhesive paste is dried so as to form the ceramic block in which the honeycomb fired bodies are firmly bonded to one another.

Next, the sealing material layer is formed on the periphery of the ceramic block so that the honeycomb structure is manufactured.

The contents of JP-A 2005-154202 are incorporated herein by reference in their entirety.

SUMMARY OF THE INVENTION

A honeycomb structure of the present invention includes a ceramic block formed by bonding a plurality of pillar-shaped honeycomb fired bodies by interposing an adhesive layer therebetween, and a sealing material layer provided on the periphery of the ceramic block. Each of the honeycomb fired bodies has a large number of cells disposed in parallel with one another in a longitudinal direction with a cell wall therebetween. The adhesive layer and the sealing material layer are integrally formed with substantially no interface to divide the two layers.

A method of manufacturing a honeycomb structure of the present invention includes providing a honeycomb structure including a ceramic block formed by bonding a plurality of pillar-shaped honeycomb fired bodies by interposing an adhesive layer therebetween, and a sealing material layer provided on the periphery of the ceramic block, each of the honeycomb fired bodies having a large number of cells disposed in parallel with one another in a longitudinal direction with a cell wall therebetween. The method further includes simultaneously carrying out a bonding step to bond the honeycomb fired bodies by interposing the adhesive layer therebetween and a sealing material layer-forming step to form the sealing material layer on the periphery of the ceramic block.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIGS. 1A to 1C are perspective views schematically showing honeycomb fired bodies to be used upon manufacturing a honeycomb structure according to an embodiment of the present invention by bonding various kinds of honeycomb fired bodies.

FIGS. 2A to 2D are vertical cross-sectional views and plan views schematically showing a holding step and an injecting step in the manufacture of the honeycomb structure according to a first embodiment of the present invention.

FIGS. 3A to 3D are vertical cross-sectional views and plan views schematically showing a holding step and an injecting step in the manufacture of the honeycomb structure according to a first embodiment of the present invention.

FIG. 4A is a vertical cross-sectional view and a plan view schematically showing a holding step and an injecting step in the manufacture of the honeycomb structure according to a first embodiment of the present invention. FIG. 4B is a perspective view schematically showing a manufactured honeycomb structure 30 according to an embodiment of the present invention.

DESCRIPTION OF THE EMBODIMENTS

Figure 5A:
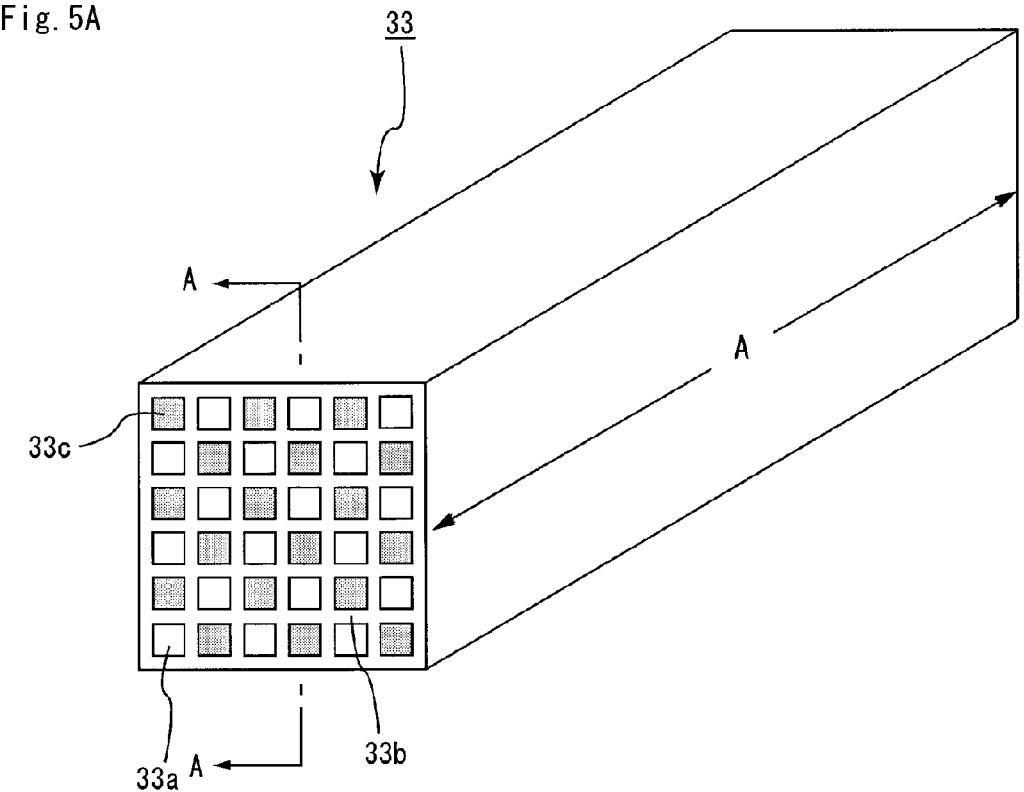
FIG. 5A is a perspective view showing a honeycomb fired body 33 forming a honeycomb structure 30 according to an embodiment of the present invention.

A honeycomb structure according to an embodiment of the present invention includes a ceramic block formed by bonding a plurality of pillar-shaped honeycomb fired bodies by interposing an adhesive layer therebetween, and a sealing material layer provided on the periphery of the ceramic block, each of the honeycomb fired bodies having a large number of cells disposed in parallel with one another in a longitudinal direction with a cell wall therebetween, wherein the adhesive layer and the sealing material layer are integrally formed with substantially no interface to divide the two layers.

In the honeycomb structure according to the embodiment of the present invention, the adhesive layer and the sealing material layer are integrally formed, and there is substantially no interface to divide the two layers.

Accordingly, it tends to be possible to prevent a destruction such as a crack from occurring between the adhesive layer and the sealing material layer.

In a honeycomb structure according to the embodiment of the present invention, the adhesive layer and the sealing material layer contain inorganic fibers and an inorganic binder.

In the honeycomb structure according to the embodiment of the present invention, there is substantially no interface to divide the adhesive layer and the sealing material layer. Further, since the inorganic fibers exist across the portion where the interface between the adhesive layer and the sealing material layer should exist in a conventional honeycomb structure, a destruction such as a crack is far less likely to occur.

In the honeycomb structure according to the embodiment of the present invention, either one end portion of each of the large number of cells is sealed with a plug.

In the honeycomb structure according to the embodiment of the present invention, since either one end portion of each of the large number of cells is sealed with a plug, the honeycomb structure functions as a honeycomb filter.

A method of manufacturing a honeycomb structure according to an embodiment of the present invention is a method of manufacturing a honeycomb structure including a ceramic block formed by bonding a plurality of pillar-shaped honeycomb fired bodies by interposing an adhesive layer therebetween, and a sealing material layer provided on the periphery of the ceramic block, each of the honeycomb fired bodies having a large number of cells disposed in parallel with one another in a longitudinal direction with a cell wall therebetween, the method including simultaneously carrying out a bonding step to bond the honeycomb fired bodies by interposing the adhesive layer therebetween and a sealing material layer-forming step to form the sealing material layer on the periphery of the ceramic block.

In the method of manufacturing the honeycomb structure according to the embodiment of the present invention, the bonding step and the sealing material layer-forming step are simultaneously carried out so as to integrally form the adhesive layer and the sealing material layer. As a result, the obtained honeycomb structure does not have an interface to divide the adhesive layer and the sealing material layer, and therefore it tends to be possible to prevent a destruction such as a crack from occurring between the adhesive layer and the sealing material layer even if heat cycles such as regeneration step are repeated over a long period of time.

A method of manufacturing the honeycomb structure according to the embodiment of the present invention includes a holding step including positioning of a plurality of the honeycomb fired bodies at predetermined positions in a cylindrical container and holding of both end faces of the honeycomb fired bodies to form a honeycomb aggregated body in which the honeycomb fired bodies are disposed with predetermined intervals between them; an injecting step for filling a paste for adhesion and sealing into inner portions and the periphery of the honeycomb aggregated body; and a drying step for drying to solidify the paste for adhesion and sealing to be made into an adhesive layer and a sealing material layer.

In the method of manufacturing the honeycomb structure according to the embodiment of the present invention, a honeycomb structure is manufactured according to the above-mentioned method. Accordingly, the obtained honeycomb structure has a structure in which the adhesive layer and the sealing material layer are integrally formed with substantially no interface to divide the two layers. Therefore, it tends to be possible to prevent occurrence of a destruction such as a crack between the adhesive layer and the sealing material layer, even after repetition of heat cycles such as regeneration step for a long period of time.

In the case where the honeycomb structure is manufactured according to the method described in JP-A 2005-154202, the adhesive layer is dried first and then the sealing material layer is formed in a separate step. As a result of this, an interface is formed between the adhesive layer and the sealing material layer.

When the above-mentioned honeycomb structure is used, for example, as a filter for purifying exhaust gases in vehicles, and a regeneration step or driving of vehicles is carried out, the temperature of the honeycomb structure is rapidly increased. Here, after repeating the heat cycle for a long period of time, the honeycomb structure body tends to be broken at the interface between the adhesive layer and the sealing material layer due to the boundary face formed between the adhesive layer and the sealing material layer.

The embodiment of the present invention is to provide a honeycomb structure which is not easily broken at the interface between the adhesive layer and the sealing material layer even after heat cycles such as regeneration steps are repeated over a long period of time.

First Embodiment

Hereinafter, the following description will discuss a first embodiment as one embodiment of the present invention with reference to drawings.

In the embodiment of the present invention, first, a raw material composition containing ceramic powders and a binder is extrusion-molded to manufacture a pillar-shaped honeycomb molded body having a large number of cells disposed in parallel with one another in a longitudinal direction with a cell wall therebetween, and next a firing treatment is carried out on the honeycomb molded body to manufacture a honeycomb fired body.

A shape of the honeycomb fired body is not particularly limited, and the shape may be a rectangular pillar-shape, and the like. In the present embodiment, the following description will discuss the case where a round pillar-shaped honeycomb structure is manufactured without carrying out post processings such as cutting, by manufacturing the honeycomb fired bodies each having a plurality of kinds of shapes and bonding them together.

FIGS. 1A to 1C are perspective views schematically showing honeycomb fired bodies to be used upon bonding various kinds of honeycomb fired bodies together. Here, a direction in parallel with the cells shown by an arrow A is referred to as a longitudinal direction, a face where the cells are exposed is referred to as an end face, and a face other than the end face is referred to as a side face.

In a honeycomb fired body 31, a large number of cells 31a are formed in parallel with one another in a longitudinal direction with a cell wall 31b therebetween, either one end of each of the cells 31a is sealed with a plug 31c, and the side faces are formed by two plane faces and one curved face.

In a honeycomb fired body 32, a large number of cells 32a are formed in parallel with one another in a longitudinal direction with a cell wall 32b therebetween, either one end of each of the cells 32a is sealed with a plug 32c, and the side faces are formed by three plane faces and one curved face.

In a honeycomb fired body 33, a large number of cells 33a are formed in parallel with one another in a longitudinal direction with a cell wall 33b therebetween, either one end of each of the cells 33a is sealed with a plug 33c, and the side faces are formed by four plane faces.

FIGS. 2A to 2D, FIGS. 3A to 3D, and FIG. 4A are vertical cross-sectional views and plan views schematically showing a bonding step (holding step) of honeycomb fired bodies and a sealing material layer-forming step (injecting step of sealing material) that are simultaneously carried out in the manufacture of the honeycomb structure according to an embodiment of the present invention using the above-mentioned honeycomb fired bodies 31, 32 and 33. In each drawing, a left view is a vertical cross-sectional view, and a right view is a plan view. Here, each honeycomb fired body is indicated only by an outline. Although, those honeycomb fired bodies are stored in a cylindrical shape container (cylindrical container), the cylindrical container is omitted in the right plan views. Also, part of the cylindrical container 18 is omitted in the vertical cross-sectional views shown in FIGS. 2A to 2D.

FIG. 4B is a perspective view schematically showing a manufactured honeycomb structure 30 according to an embodiment of the present invention.

In the present embodiment, a holding step including positioning of a plurality of the honeycomb fired bodies at predetermined positions in the cylindrical container and holding of both end faces of the honeycomb fired bodies to form an almost round pillar-shaped honeycomb aggregated body in which the honeycomb fired bodies are disposed with predetermined intervals between them; an injecting step for filling a paste for adhesion and sealing into inner portions of the honeycomb aggregated body (space between the plurality of honeycomb fired bodies held at the predetermined positions) and the periphery of the honeycomb aggregated body (space between the cylindrical container and the honeycomb fired bodies); and a drying step for drying to solidify the paste for adhesion and sealing to be made into an adhesive layer and a sealing material layer, are carried out.

In the present embodiment, a plurality of the honeycomb fired bodies are preliminarily placed on a mounting face of each of a plurality of mounting members having the mounting face, in such a manner that the honeycomb fired bodies are disposed in parallel with one another in the longitudinal direction.

Next, as shown in FIG. 2A, two pieces of the honeycomb fired bodies 31 are disposed at the right and left ends on a mounting face 10a of a mounting member 10, and on the other hand, two pieces of the honeycomb fired bodies 32 are disposed between the two pieces of the honeycomb fired bodies 31, and then, the mounting member 10 on which these honeycomb fired bodies 31 and 32 have been placed is conveyed into inside of a cylindrical container 18 into which injection of the paste for adhesion and sealing is possible, and the mounting member 10 is fixed at a predetermined position.

Protruding portions 11a and 11b for positioning are installed at four corners of each of the four pieces of honeycomb fired bodies 31 and 32 which are disposed in parallel with one another in the longitudinal direction on the mounting face 10a of the mounting member. Thus, each of the honeycomb fired bodies 31 and 32 is placed within the predetermined position. That is, each of the honeycomb fired bodies 31 and 32 is surrounded by the four protruding portions 11a and 11b disposed at the four corners of each of the honeycomb fired bodies, and the positions of those honeycomb fired bodies in a lateral direction in the drawing are regulated by those protruding portions 11a and 11b. In this case, a total of ten protruding portions 11a and 11b are formed on the mounting face 10a.

The mounting member 10 is fixed in such a manner that the mounting face 10a is disposed horizontally, and a distance between each of the honeycomb fired bodies 31 and 32 and the cylindrical container is set to a predetermined distance d1, and a distance from the highest part of the inside of the cylindrical container 18 to the mounting face 10a is set to a distance h1. In a posterior step, the sealing material layer is formed between the cylindrical container 18 and the honeycomb fired bodies 31 and 32.

The position of the mounting member 10 in the vertical direction (distance h1) is determined by previously measuring the maximum vertical width of the honeycomb fired body 32, and then calculating the distance from the uppermost portion of the inner part of the cylindrical container 18 to the upper surface 10a of the mounting member 10 by adding the above-obtained measured value with the distance d1. The position of the mounting member 10 in the horizontal direction is determined in such a manner that the mounting member is disposed at the position where the center axis of the cylindrical container (in the longitudinal direction) and the center axis of the mounting member 10 in the longitudinal direction overlap in the vertical direction. The positions as mentioned above can be obtained by calculation, and therefore it is possible to dispose the mounting member 10 at the calculated position by using a robot and the like having a gripper such as an arm and the like.

Next, as shown in FIG. 2B, holding members 20 extend to reach both end faces of the honeycomb fired bodies 31 and 32, and make contact with the both end faces of the honeycomb fired bodies 31 and 32, and then firmly sandwich and hold the honeycomb fired bodies 31 and 32 from the both end faces.

In this case, the holding members 20 hold the honeycomb fired bodies 31 and 32 in such a manner that the end faces 31a and 32a of the respective honeycomb fired bodies 31 and 32 are aligned in the same plane.

Next, the mounting member 10 is moved to another place. Here, the honeycomb fired bodies 31 and 32 are firmly held by the holding members 20, and therefore those honeycomb fired bodies are remained at the same position where they were placed on the mounting member 10.

Next, as shown in FIG. 2C, a mounting member 12 having a mounting face 12a on which two pieces of honeycomb fired bodies 32 and two pieces of square pillar-shaped honeycomb fired bodies 33 are placed in parallel with one another, with each of the honeycomb fired bodies surrounded by four protruding portions 13a and 13b, is conveyed to a location under the four pieces of the honeycomb fired bodies 31 and 32 which are held by the holding members 20. In the present case, a total of 10 protruding portions 13a and 13b are installed on the mounting face 12a of the mounting member 12. Subsequently, the mounting member 12 is placed in such a manner that a vertical distance h2 between the uppermost portion of the fixed four pieces of the upper honeycomb fired bodies 31 and 32 and the lowermost portion of the four pieces of the lower honeycomb fired bodies 32 and 33 is set to a predetermined distance; a bottom face of the four pieces of the upper honeycomb fired bodies 31 and 32 and a bottom face of the four pieces of the lower honeycomb fired bodies 32 are made in parallel with one another; and supposing that the center axis is set in the longitudinal direction, the center axis of the entire four pieces of the upper honeycomb fired bodies 31 and 32 and the center axis of the entire four pieces of the lower honeycomb fired bodies 32 and 33 are superposed in the vertical direction.

Next, as shown in FIG. 2D, other holding members 21 extend to reach both end faces of the honeycomb fired bodies 32 and 33, and make contact with the both end faces of the honeycomb fired bodies 32 and 33; and then firmly sandwich and hold the honeycomb fired bodies 32 and 33 from the both end faces.

In this case, the holding members 21 hold the honeycomb fired bodies 32 and 33 in such a manner that the end faces of the eight pieces of the honeycomb fired bodies 31, 32 and 33 (hereinafter, referred to as the honeycomb fired bodies 31 to 33) are aligned in the same plane.

Then, the mounting member 12 is moved to another place in the same manner as mentioned above. Here, the honeycomb fired bodies 32 and 33 are firmly held by the holding members 21, and therefore those honeycomb fired bodies are fixed at the same position where they were placed on the mounting member 12.

Next, as shown in FIG. 3A, a mounting member 14 having a mounting face 14a on which two pieces of the honeycomb fired bodies 32 and two pieces of the honeycomb fired bodies 33 are placed in parallel with one another, with each of the honeycomb fired bodies surrounded by four protruding portions 15a and 15b, is conveyed to a location under the eight pieces of honeycomb fired bodies 31 to 33 which are held by the holding members 20 and 21. In the present case, a total of ten protruding portions 15a and 15b are installed on the mounting face 14a. Subsequently, the mounting member 14 is placed in such a manner that a vertical distance h3 between the uppermost portion of the fixed eight pieces of the upper honeycomb fired bodies 31 to 33 and the lowermost portion of the four pieces of the lower honeycomb fired bodies 32 and 33 is set to a predetermined distance; a bottom face of the eight pieces of the upper honeycomb fired bodies 31 to 33 and a bottom face of the four pieces of the lower honeycomb fired bodies 32 and 33 are made in parallel with one another; and supposing that the center axis is set in the longitudinal direction, the center axis of the entire eight pieces of the upper honeycomb fired bodies 31 to 33 and the center axis of the entire four pieces of the lower honeycomb fired bodies 32 and 33 are superposed in the vertical direction.

Next, as shown in FIG. 3B, other holding members 22 extend to reach both end faces of the honeycomb fired bodies 32 and 33, and make contact with the both end faces of the honeycomb fired bodies 32 and 33, and then firmly sandwich and hold the honeycomb fired bodies 32 and 33 from the both end faces.

In this case, the holding members 22 hold the honeycomb fired bodies 32 and 33 in such a manner that the end faces of the 12 pieces of those honeycomb fired bodies 31 to 33 are aligned in the same plane.

Then, the mounting member 14 is moved to another place in the same manner as mentioned above. Here, the honeycomb fired bodies 32 and 33 are firmly held by the holding members 22, and therefore those honeycomb fired bodies are fixed at the same position where they were placed on the mounting member 14.

Next, as shown in FIG. 3C, a mounting member 16 having a mounting face 16a formed a curved shape on which two pieces of the honeycomb fired bodies 31 and two pieces of the honeycomb fired bodies 32 are placed at predetermined positions, which are fixed by six protruding portions 17a and 17b, is conveyed to a location under the 12 pieces of honeycomb fired bodies 31 to 33 which are held by the holding members 20, 21, and 22. Subsequently, the mounting member 16 is placed in such a manner that a vertical distance h4 between the uppermost portion of the fixed 12 pieces of the upper honeycomb fired bodies 31 to 33 and the lowermost portion of the four pieces of the lower honeycomb fired bodies 31 and 32 is set to a predetermined distance; a bottom face of the 12 pieces of the upper honeycomb fired bodies 31 to 33 and a top face of the four pieces of the lower honeycomb fired bodies 31 and 32 are made in parallel with one another; and supposing that the center axis is set in the longitudinal direction, the center axis of the entire twelve pieces of the upper honeycomb fired bodies 31 to 33 and the center axis of the entire four pieces of the lower honeycomb fired bodies 31 and 32 are superposed in the vertical direction.

Here, in this case, the two pieces of the honeycomb fired bodies 31 and the two pieces of the honeycomb fired bodies 32 correspond to a bottom portion of a round pillar-shaped honeycomb structure to be manufactured, and thus those honeycomb fired bodies are required to be placed with their curved portions facing down. Therefore, as shown in FIG. 3C, the honeycomb fired bodies 31 and 32 are placed with their curved portions facing down in such a manner that the mounting face 16a has the same curved shape as the curved shape formed with the bottom portions of the honeycomb fired bodies 31 and 32; and the honeycomb fired bodies 31 and 32 fit the mounting face 16a of the mounting member 16 having an arc-shaped cross section with a thickness thinner than the thickness of the sealing material layer d1.

Next, as shown in FIG. 3D, other holding members 23 disposed in the neighborhood of the cylindrical container 18 extend to reach both end faces of the honeycomb fired bodies 31 and 32, and make contact with the both end faces of the honeycomb fired bodies 31 and 32, and then firmly sandwich and hold the honeycomb fired bodies 31 and 32 from the both end faces.

In this case, the holding members 23 hold the honeycomb fired bodies 31 and 32 in such a manner that the end faces of the 16 pieces of the honeycomb fired bodies 31 to 33 are aligned in the same plane. Thereafter, the mounting member 16 is pulled out between the cylindrical container 18 and the honeycomb fired bodies 31 and 32.

Thus, the 16 pieces of the honeycomb fired bodies 31 to 33 forming the honeycomb structure 30 can be aligned and fixed in parallel with one another in the longitudinal direction, with the end face thereof on each side forming the same plane. The 16 pieces of the honeycomb fired bodies 31 to 33 thus aligned is referred to as a honeycomb aggregated body 300.

Thereafter, as shown in FIG. 4A, an end-face adhering member 40 formed with an annular-shaped outer frame 40a and a lattice-shaped inner frame 40b is attached firmly to the cylindrical container 18 and the honeycomb aggregated body 300 on both sides thereof so as to seal the gap portions between the cylindrical container 18 and the honeycomb aggregated body 300 in order to prevent the paste for adhesion and sealing from leaking out of the cylindrical container 18 upon injection of the paste for adhesion and sealing. The cylindrical container 18 is provided with an injection pipe 18a for injecting the paste for adhesion and sealing. By injecting the paste for adhesion and sealing through the injection pipe 18, the gap portions between the honeycomb fired bodies 31 to 33 forming the honeycomb aggregated body 300 as well as the gap portions between the honeycomb fired bodies 31 to 33 and the cylindrical container 18, which correspond to the peripheral portion of the honeycomb aggregated body, are filled in with the paste for adhesion and sealing to seal those gap portions.

Although not shown in the figures, the cylindrical container 18 is able to be divided into two parts. Accordingly, after the paste for adhesion and sealing is hardened to some extent by heating treatment and the like, the cylindrical container 18 is divided and then transferred to another place. Further, by drying the paste for adhesion and sealing at a predetermined temperature, it is possible to obtain a honeycomb structure 30 having the honeycomb fired bodies 31 to 33 bonded to one another with the adhesive layer 34 therebetween, and the sealing material layer 35 formed on the outer periphery of the honeycomb fired bodies, in which the adhesive layer 34 used for bonding the honeycomb fired bodies and the sealing material layer 35 formed on the outer periphery are integrally formed with substantially no interface to divide the two layers.

In the above-mentioned step, only the drying treatment of the paste for adhesion and sealing is performed, but alternatively, a degreasing treatment or a firing treatment may be performed at a higher temperature after carrying out the drying treatment on the paste for adhesion and sealing.

In comparison with the conventional case where the adhesive layer 34 and the sealing material layer 35 are formed separately, in the above-mentioned embodiment, the adhesive layer 34 bonding the honeycomb fired bodies 31 to 33 and the sealing material layer 35 provided on the outer periphery are integrally formed with substantially no interface to divide the two layers. Therefore, it tends to be possible to prevent occurrence of a destruction such as a crack between the adhesive layer 34 and the sealing material layer 35, even after repetition of heat cycles such as regeneration step for a long period of time.

Also, in the above-mentioned embodiment, the horizontal interval distance between the honeycomb fired bodies in the honeycomb structures 30 is controlled by forming protruding portions on the mounting face of the mounting member, and the interval distance in the perpendicular direction is controlled by controlling the position of the mounting member in the vertical direction. Therefore, a large dimensional distortion, which is caused by deviation to a side where a variation in the dimension of each of the honeycomb fired bodies or a variation in the gap between the honeycomb fired bodies is large or small, does not tend to occur, making it easier to manufacture a honeycomb aggregated body 300 having a high dimensional accuracy. Accordingly the sealing material layer 35 does not need to be made thick to cover the displacement and can be easily made to be thin.

In the above, the method of positioning a plurality of honeycomb fired bodies at predetermined positions and then sandwiching and holding the honeycomb fired bodies by the holding members from the end faces thereof are described. Here, the method of holding the honeycomb fired bodies is not limited to the method of sandwiching and holding by holding members, but may include any other holding methods such as a method in which the honeycomb fired body is hung by holding members by hooking both end faces of the honeycomb fired body. However, the method of sandwiching and holding by the holding members is preferable in consideration of easiness of holding, certainty, and influence of a crack or damage in the outer periphery of the honeycomb fired bodies.

In addition, the honeycomb aggregated body is not necessarily formed in advance in the cylindrical container. Alternatively, a honeycomb structure may be manufactured in such a manner that a honeycomb aggregate body is formed by positioning a plurality of honeycomb fired bodies at predetermined positions and holding both end faces thereof with holding members; by using a cylindrical container 18 and end-face adhering members 40, the honeycomb aggregated body 300 as shown in FIG. 4A is disposed in the cylindrical container 18 with the end-face adhering members 40 provided on both end faces of the honeycomb aggregated body 300; and the paste for adhesion and sealing is filled in the cylindrical container 18 and then heated.

In the honeycomb structure 30 shown in FIG. 4B, either one end portion of each of the cells is sealed, and therefore the honeycomb structure can be used as a honeycomb filter for purifying exhaust gases. Also, a catalyst can be supported on the honeycomb structure depending on the case.

On the other hand, the honeycomb structure may be a kind of honeycomb structure in which both end faces of a cell are not sealed with a plug. This kind of honeycomb structure can be preferably used as a catalyst supporting carrier to convert exhaust gases.

Figure 5B:
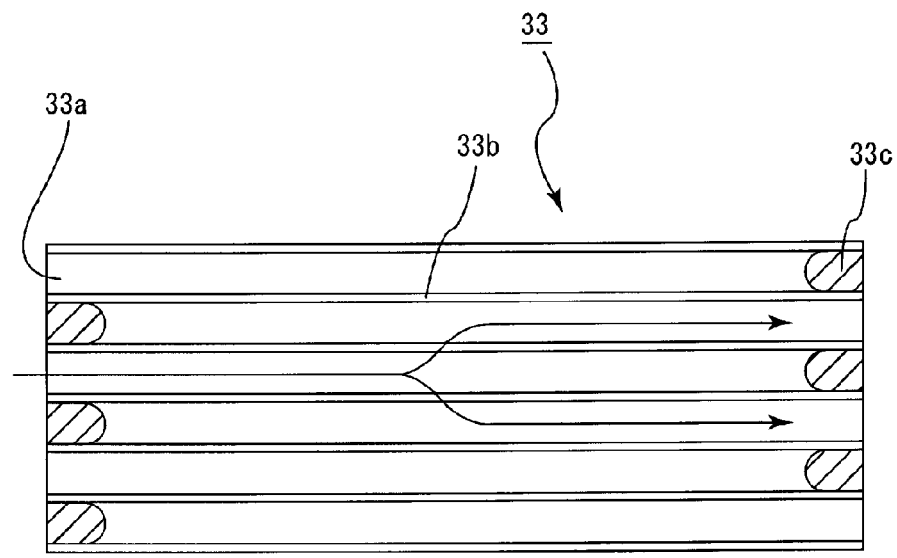
FIG. 5B is an A-A line cross-sectional view of FIG. 5A.

FIG. 5A is a perspective view showing the honeycomb fired body 33 forming the honeycomb structure 30 according to an embodiment of the present invention, and FIG. 5B is an A-A line cross-sectional view of the honeycomb fired body 33.

In the honeycomb fired body 33, a large number of cells 33a are disposed in parallel with one another in a longitudinal direction (the direction shown by an arrow A in FIG. 5A), and a cell wall 33b partitioning the cells 33a functions as a filter. The other honeycomb fired bodies 31 and 32 also have the same structure.

More specifically, either one end on exhaust-gas inlet side or outlet side of each of the cells 33a disposed in the honeycomb fired body 33, which forms the honeycomb structure 30, is sealed with a plug 33c, and exhaust gases flowing into one cell 33a always pass through the cell wall 33b partitioning the cells 33a and thereafter flow out from another cell 33a. Upon passing through the cell wall 33b, particulates are captured by the cell wall 33b so that the exhaust gases are purified.

Hereinafter, all steps in the method of manufacturing a honeycomb structure according to the present embodiment will be described. The following description will discuss a method of manufacturing a honeycomb structure in which either one end of the honeycomb structure is sealed with a plug.

First, a powder mixture is prepared as a ceramic material by mixing silicon carbide powders having different average particle diameters with an organic binder, and a liquid mixture is also prepared by mixing a liquid plasticizer, a lubricant, and water. Next, the powder mixture and the liquid mixture are mixed by a wet mixing machine to prepare a wet mixture for manufacturing a molded body.

A particle diameter of the silicon carbide powder is not particularly limited, and the silicon carbide powder which tends not to cause the case where the size of the honeycomb structure manufactured by the following firing treatment becomes smaller than that of a degreased honeycomb molded body is preferable. For example, a silicon carbide powder obtained by combining 100 parts by weight of a powder having an average particle diameter of at least about 0.3 µm and at most about 50 µm and at least about 5 parts by weight and at most about 65 parts by weight of another powder having an average particle diameter of at least about 0.1 µm and at most about 1.0 µm is preferable.

It is possible to adjust a pore diameter and the like of the honeycomb fired body by controlling a particle diameter of the inorganic powder.

Next, the wet mixture is charged into an extrusion-molding apparatus.

Upon charging the wet mixture into the extrusion-molding apparatus, the wet mixture is extrusion-molded to be made into a honeycomb molded body having a predetermined shape. The honeycomb molded body is dried by a drying apparatus to obtain a dried honeycomb molded body.

Thereafter, both end faces of the dried honeycomb molded body are cut by a cutting apparatus so that the honeycomb molded body is cut into a predetermined length. Then, a predetermined amount of a plug material paste that forms a plug is filled into end portions of the gas-outlet side of a group of cells in which an end face of the gas-inlet side is open and is also filled into end portions of the gas-inlet side of a group of cells in which an end face of the gas-outlet side is open, so that the cells are sealed. Upon sealing the cells, it is possible to use a method in which a mask for sealing is attached to the end face of the honeycomb molded body (that is, a cut face after cutting) so that only the cells required to be sealed are filled in with the sealing material paste.

Thus, through the above-mentioned step, a cell-sealed honeycomb molded body is manufactured.

Next, the cell-sealed honeycomb molded body is degreased in a degreasing furnace to heat organic substances contained therein, and conveyed to a firing furnace, and then fired so that a honeycomb fired body is manufactured.

Thereafter, as described with reference to FIGS. 2A to 2D, FIGS. 3A to 3D and FIGS. 4A and 4B, a plurality of the honeycomb fired bodies are positioned at predetermined positions in the cylindrical container, and both end faces of the honeycomb fired bodies are sandwiched and held by the holding members. Next, the paste for adhesion and sealing is injected into gap portions between the plurality of honeycomb fired bodies held at predetermined positions and the gap between the cylindrical container and the honeycomb fired bodies, and further, the paste for adhesion and sealing is dried and solidified so as to manufacture a honeycomb structure in which an adhesive layer and a sealing material layer are integrally formed with substantially no interface to divide the two layers.

Here, as the paste for adhesion and sealing, for example, a paste containing an inorganic binder, an organic binder, and at least one of an inorganic fiber and an inorganic particle, can be used.

The following description will discuss operations and effects of the honeycomb structure according to the present embodiment.

In the honeycomb structure according to the first embodiment, a bonding step to bond honeycomb fired bodies by interposing an adhesive layer therebetween and a sealing material layer-forming step to form the sealing material layer on the periphery of the ceramic block are simultaneously carried out so that the adhesive layer and the sealing material layer are integrally formed. As a result, the obtained honeycomb structure does not have an interface to divide the adhesive layer and the sealing material layer, and therefore it tend to be possible to prevent occurrence of a destruction such as a crack between the adhesive layer and the sealing material layer even after repetition of heat cycles such as regeneration step for a long period of time.

EXAMPLES

Hereinafter, examples that disclose the first embodiment of the present invention more specifically are shown, but the present invention is not limited to those examples.

In the following example and comparative example, honeycomb structures were manufactured by the method according to the above-mentioned embodiment and by a conventional method, respectively, and by carrying out heat-cycle test on the honeycomb structures, occurrence of a destruction such as a crack in the obtained honeycomb structures was observed.

Example 1

(1) An amount of 52.8% by weight of a silicon carbide coarse powder having an average particle diameter of 22 µm and an amount of 22.6% by weight of a silicon carbide fine powder having an average particle diameter of 0.5 µm were mixed, and to the obtained mixture were added 2.1% by weight of an acrylic resin, 4.6% by weight of an organic binder (methyl cellulose), 2.8% by weight of a lubricant (UNILUB, manufactured by NOF Corp.), 1.3% by weight of glycerin, and 13.8% by weight of water, and then mixed and kneaded to obtain a mixed composition. The mixed composition was then extrusion-molded to provide a raw honeycomb molded body. Then, these raw honeycomb molded bodies were cut to have a length of 150 mm in a longitudinal direction so that the raw honeycomb molded body having almost the same shape as that of the honeycomb fired body 31 shown in FIG. 1A, a raw honeycomb molded body having almost the same shape as that of the honeycomb fired body 32 shown in FIG. 1B, and a raw honeycomb molded body having almost the same shape as that of the honeycomb fired body 33 shown in FIG. 1C were manufactured.

(2) Next, the raw honeycomb molded bodies were dried by using a microwave drying apparatus to obtain dried honeycomb molded bodies. Thereafter, predetermined cells of the dried honeycomb molded bodies were filled in with a paste having the same composition as that of the raw honeycomb molded bodies, and dried again by the drying apparatus.

(3) The dried honeycomb molded bodies were degreased at a temperature of 400° C., and then a firing treatment was carried out at a temperature of 2200° C. under a normal-pressure argon atmosphere for 3 hours to manufacture honeycomb fired bodies 31, 32, and 33.

The manufactured honeycomb fired bodies 31 to 33 had a size including a length of 150 mm, the number of cells of 31 pcs/cm2, and a thickness of a cell wall of 0.3 mm.

(4) A honeycomb structure was manufactured through the above-mentioned method (method shown in FIGS. 2A to 2D, FIGS. 3A to 3D, and FIGS. 4A and 4B) by using a heat-resistant paste for adhesion and sealing containing 30% by weight of alumina fibers having an average fiber length of 20 µm; 21% by weight of silicon carbide particles having an average particle diameter of 0.6 µm; 15% by weight of silica sol; 5.6% by weight of carboxymethyl cellulose; and 28.4% by weight of water.

More specifically, the honeycomb structure was manufactured in the following manner. First, four pieces of honeycomb fired bodies were disposed in advance in parallel with one another in a longitudinal direction on a mounting member on which protruding portions for positioning were formed; the honeycomb fired bodies were positioned at predetermined positions by accurately transferring the mounting member to a certain position based on the cylindrical container; end faces of each of the honeycomb fired bodies were sandwiched and held by the holding members; a paste for adhesion and sealing is filled into the gap spaces in a honeycomb aggregated body formed with the positioned 16 pieces of the honeycomb fired bodies and the gap between the honeycomb aggregated bodies and the cylindrical container to combine the 16 pieces of the honeycomb fired bodies as well as to form a sealing material layer; and a drying step is carried out at 120° C. Here, the diameter of the honeycomb structure having a round pillar shape was set to 145 mm.

Thereafter, a portion corresponding to a boundary of the adhesive layer and the sealing material layer was observed by a scanning electron microscope (SEM).

Figure 9:
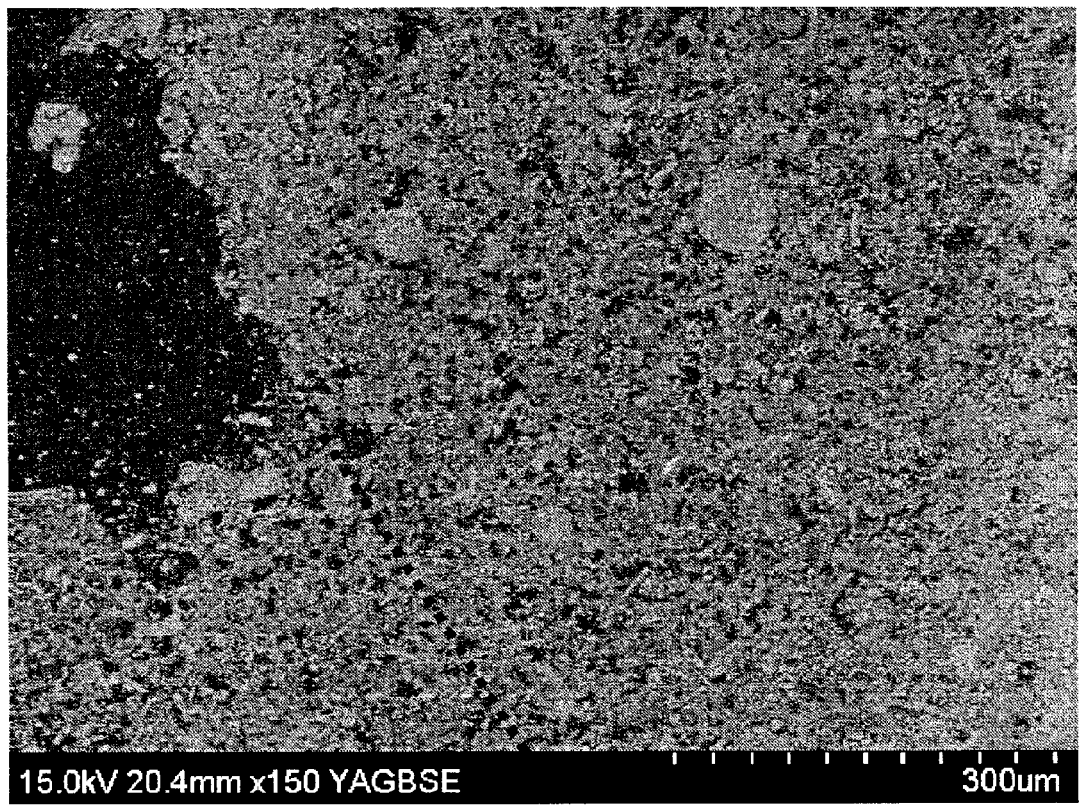
FIG. 9 shows an SEM image of a portion corresponding to the boundary of the adhesive layer and the sealing material layer in the honeycomb structure of Example 1.

FIG. 9 is an SEM image showing the result obtained above.

As shown in FIG. 9, in Example 1, no boundary was observed in the honeycomb structure, and there was no portion that could be detected as a boundary in a portion supposed to be an interface between the ceramic block and the sealing material layer (portion shown by a black dashed line) in the case of a conventional product.

Comparative Example 1

(1) An amount of 52.8% by weight of a silicon carbide coarse powder having an average particle diameter of 22 μm and an amount of 22.6% by weight of a silicon carbide fine powder having an average particle diameter of 0.5 μm were mixed, and to the obtained mixture were added 2.1% by weight of an acrylic resin, 4.6% by weight of an organic binder (methyl cellulose), 2.8% by weight of a lubricant (UNILUB, manufactured by NOF Corp.), 1.3% by weight of glycerin, and 13.8% by weight of water, and then mixed and kneaded to obtain a mixed composition. The mixed composition was extrusion molded to provide a raw honeycomb molded body. Then, the raw honeycomb molded body was cut to have a length of 150 mm in a longitudinal direction so that the raw honeycomb molded body having almost the same shape as that of the honeycomb fired body 33 shown in FIG. 1C was manufactured.

(2) Next, the raw honeycomb molded body was dried by using a microwave drying apparatus to obtain a dried honeycomb molded body. Thereafter, predetermined cells of the dried honeycomb molded body were filled in with a paste having the same composition as that of the raw honeycomb molded body, and dried again by the drying apparatus.

(3) The dried honeycomb molded body was degreased at a temperature of 400° C., and then a firing treatment was carried out at a temperature of 2200° C. under a normal-pressure argon atmosphere for 3 hours to manufacture a honeycomb fired body 33.

The manufactured honeycomb fired body 33 had a size including a length of 150 mm, the number of cells of 31 pcs/cm2, and a thickness of a cell wall of 0.3 mm.

(4) Next, an adhesive paste layer having a thickness of about 1 mm was formed by applying a heat-resistant adhesive paste containing 30% by weight of alumina fibers having an average fiber length of 20 μm; 21% by weight of silicon carbide particles having an average particle diameter of 0.6 μm; 15% by weight of silica sol; 5.6% by weight of carboxymethyl cellulose; and 28.4% by weight of water at an almost even thickness, and another honeycomb fired body was placed on the adhesive paste layer and this step was repeated, and then drying step for drying at a temperature of 120° C. was carried out, thereby a large rectangular pillar-shaped laminated body formed with 16 pieces of the honeycomb fired bodies 33 was formed. A round pillar-shaped ceramic block having a diameter of 143 mm was manufactured by cutting the laminated body using a diamond cutter.

(5) A sealing material paste having the same composition as the adhesive paste is used to form a sealing material paste layer on the periphery of the ceramic block, and then dried at 120° C., thereby a sealing material layer having a thickness of 1.0 mm was formed.

Figure 10:
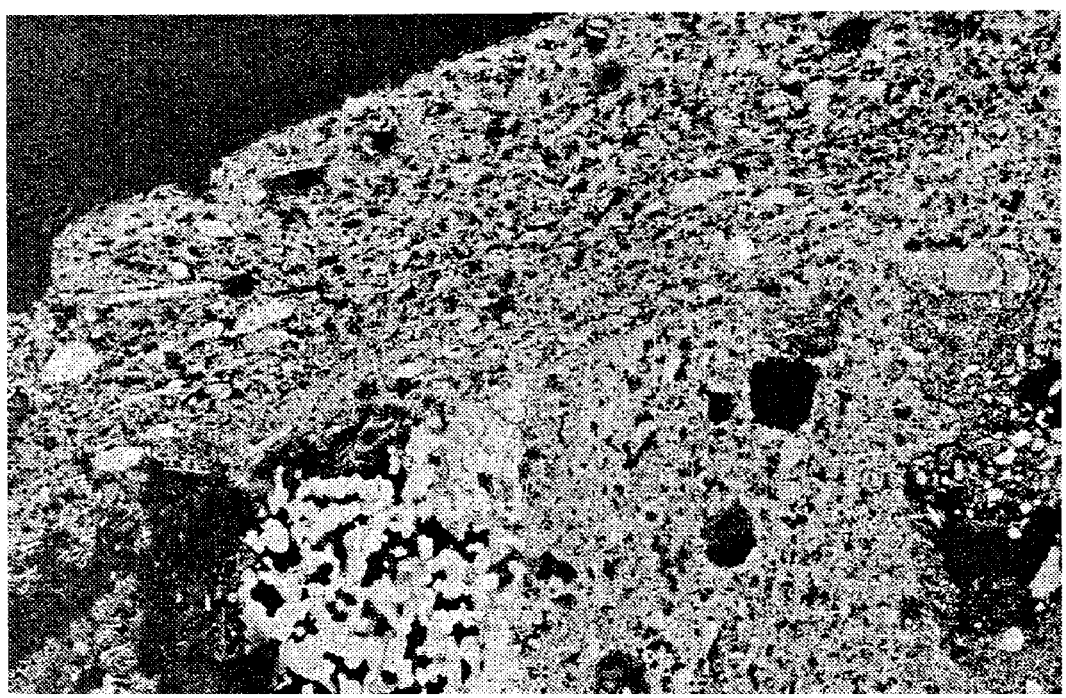
FIG. 10 shows an SEM image of a boundary portion between the adhesive layer and the sealing material layer in the honeycomb structure of Comparative Example 1.
Figure 11:
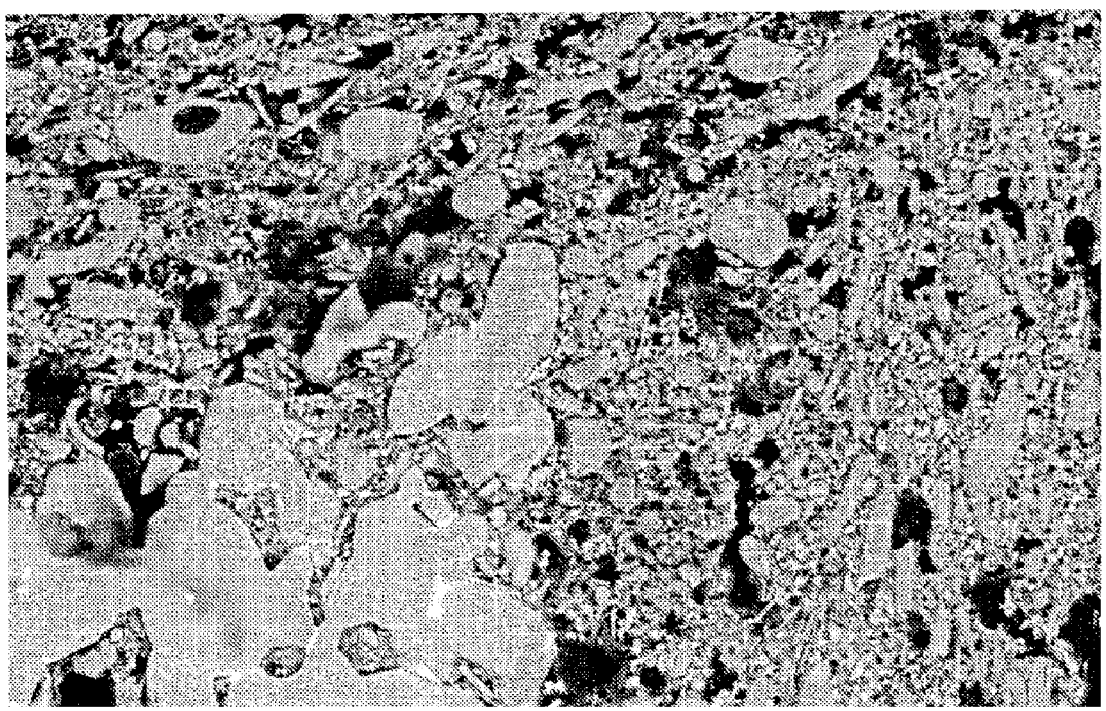
FIG. 11 shows an SEM image of a boundary portion between the adhesive layer and the sealing material layer in the honeycomb structure of Comparative Example 1 (enlarged view of FIG. 10).

Thereafter, as in Example 1, a portion corresponding to a boundary of the adhesive layer and the sealing material layer of the honeycomb structure was observed by an SEM. FIGS. 10 and 11 are SEM images showing the results obtained above. Here, the FIG. 11 is an enlarged view of the boundary portion in FIG. 10.

As shown in FIGS. 10 and 11, in Comparative Example 1, the boundary portion between the ceramic block and the sealing material layer could be clearly detected, and an apparent boundary was generated at the boundary portion of the adhesive layer and the sealing material layer.

(Evaluation of Durability to Cycle Driving)

First, the honeycomb structures according to Example 1 and Comparative Example 1 were disposed at an exhaust passage of an engine, and at a position closer to a gas-inlet side than those honeycomb structures, a commercially available catalyst supporting honeycomb structure made of cordierite (diameter: 145 mm, length: 100 mm, number of cells (cell density): 400 pcs/inch2, amount of supported platinum: 5 g/L) was placed as an exhaust gas converting device, and while the engine was driven at the number of revolutions of 3000 min-1 and a torque of 50 Nm, particulates were captured for 7 hours. The amount of the captured particulates was 8 g/L.

Next, the engine was driven at the number of revolutions of 1250 min-1 and a torque of 60 Nm, and when the temperature of the filter became constant, the state was kept for 1 minute. Thereafter, a post injection was performed, and then the temperature of exhaust gases was raised by utilizing the oxidation catalyst present at the front side of the engine to burn particulates.

The conditions for the post injection were set so that the temperature of the center part of the honeycomb structures was raised and became almost constant at 600° C. within 1 minute from the initiation. After this step was repeated 10 times, generation of cracks and the like in the honeycomb fired bodies was visually observed.

The result shows that, cracks were generated in the boundary portion between the adhesive layer and the sealing material layer of the honeycomb structure of Comparative Example 1, while on the other hand, no boundary portion between the adhesive layer and the sealing material layer was observed and no cracks was generated in the honeycomb structure of Example 1.

Second Embodiment

In the first embodiment, the mounting member having the protruding portions for positioning installed thereon was used. Alternatively, the mounting member may be a mounting member having a mounting face on which groove portions for positioning are formed.

FIGS. 6A to 6D are front views schematically showing mounting members on which groove portions for positioning are formed and honeycomb fired bodies according to an embodiment of the present invention placed on the mounting members.

Figure 6A:
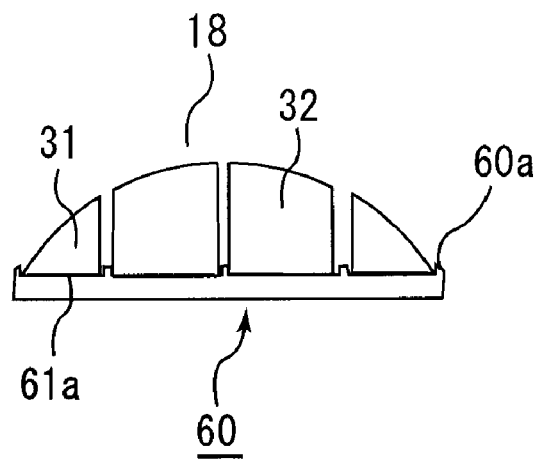
FIGS. 6A to 6D are front views schematically showing a mounting member provided with groove portions for positioning on the mounting face, and honeycomb fired bodies according to an embodiment of the present invention placed on the mounting member.
Figure 6B:
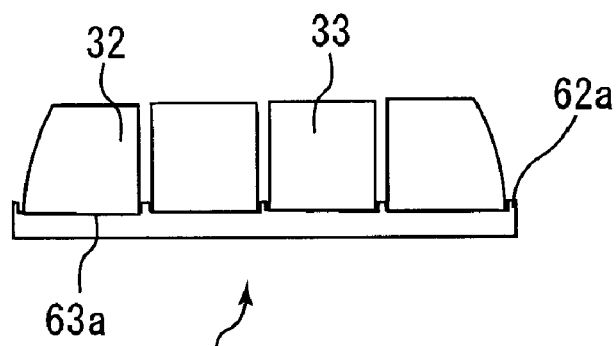
Figure 6C:
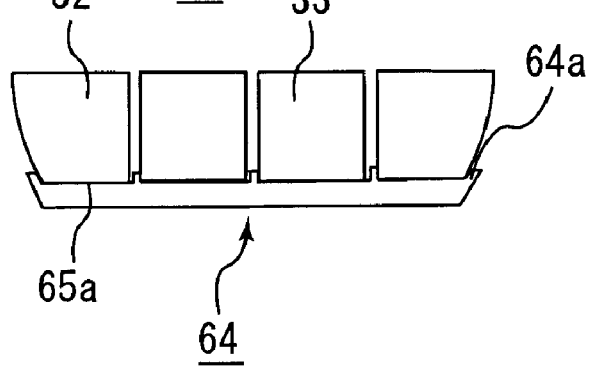

FIGS. 6A to 6C show mounting members 60, 62 and 64 respectively having mounting faces 60a, 62a and 64a on which groove portions 61a, 63a, and 65a are respectively formed. Although plan views are not shown, the bottom portion of each of the honeycomb fired bodies 31 to 33 is respectively placed in the groove portions 61a, 63a, and 65a, which are formed with the same width in the longitudinal direction. In the groove portion, each of the honeycomb fired bodies 31 to 33 is allowed to move only slightly in a lateral direction.

Figure 6D:
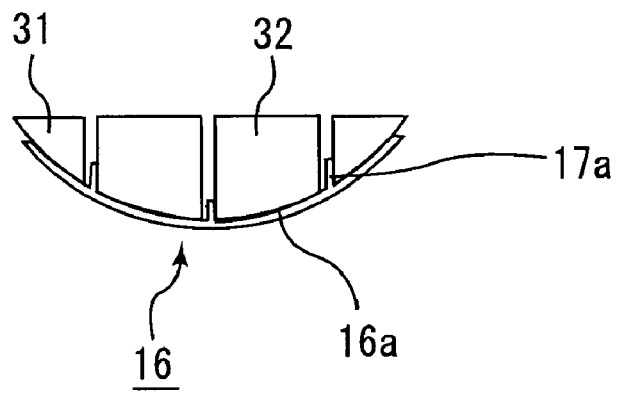

The mounting member for mounting the honeycomb fired bodies 31 and 32, which correspond to the bottom part of the honeycomb structure, is required to have a downward convex shape. The mounting face 16a of the mounting member 16 shown in FIG. 3C has the same shape as the lower part of the honeycomb fired bodies 31 and 32, and also has an arc shape with a thickness thinner than the thickness d1 of the sealing material layer. Thus, as shown in FIG. 6D, this mounting member 16 is also used in the second embodiment. Moreover, groove portions may be formed on the mounting face 16a by sequentially forming protruding portions 17a on the mounting face 16a in the longitudinal direction.

Since the method of manufacturing a honeycomb structure is carried out in the same manner as in the first embodiment except for using the mounting members 60, 62, 64, and 16 shown in FIGS. 6A to 6D as mounting members, the detail description is omitted.

In the method of manufacturing a honeycomb structure according to the second embodiment, the same operations and effects as those of the first embodiment can be enjoyed.

Third Embodiment

In the first embodiment and the second embodiment, those holding members configured to be able to hold each of the honeycomb fired bodies by making contact with the end faces of the plurality of honeycomb fired bodies were used. Alternatively, the holding members may be configured to be able to hold the plurality of honeycomb fired bodies collectively by making contact with the end faces of the plurality of honeycomb structures.

FIGS. 7A to 7D and FIGS. 8A to 8D are schematic views showing holding members, which are configured to be able to hold the plurality of honeycomb fired bodies collectively by making contact with the end faces of the plurality of honeycomb fired bodies, and the cylindrical container. Here, each of the honeycomb fired bodies is shown only by an outline.

First, the following description will discuss a holding member used in the present embodiment. As shown in FIGS. 7A to 7D and FIGS. 8A to 8D, each of holding members 70, 72, 74 and 76 is formed by respective contact holding members 70a, 72a, 74a and 76a, and respective supporting members 71a, 73a, 75a and 77a which support the contact holding members.

That is, a single holding member 70 includes a single plate-shape contact holding member 70a and four supporting members 71a which support the contact holding member 70a, and the contact holding member 70a collectively sandwiches and holds firmly the four pieces of honeycomb fired bodies placed on the mounting member. The number of the supporting member 71a is not limited to four. Each of the contact holding members 70a, 72a, 74a, and 76a also functions as an end face adhering member 40 which prevents the paste for adhesion and sealing from overflowing from the end faces or the cylindrical container 18 (see FIG. 4A). Although not shown, an air vent is formed on a portion making contact with the cells of the honeycomb fired body.

The following description will briefly discuss a step of forming a honeycomb aggregated body in a cylindrical container and filling a paste for adhesion and sealing into inner portions of the honeycomb aggregated body and the gap between the honeycomb aggregated body and the cylindrical container, with reference to FIGS. 7A to 7D and FIGS. 8D to 8D.

First, as in the same manner of the first embodiment, four pieces of the honeycomb fired bodies 31 and 32 are disposed on the mounting member 10a of the mounting member 10, and then conveyed to the inner part of the cylindrical container 18, and fixed at predetermined positions so that the mounting face 10a is horizontally placed.

Figure 7A:
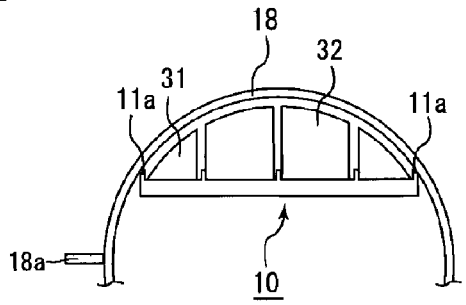
FIGS. 7A to 7D are vertical cross-sectional views and plan views schematically showing a holding step and an injecting step in the manufacture of a honeycomb structure according to the third embodiment of the present invention.
Figure 7B:
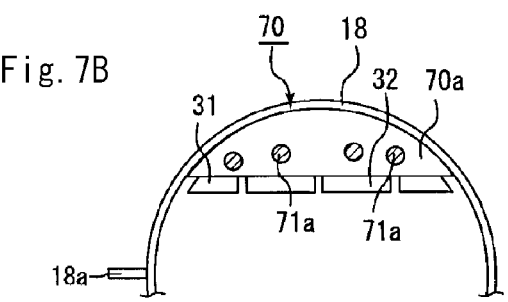

Next, the holding members 70 disposed in the neighborhood of the cylindrical container 18 extend to reach both end faces of the honeycomb fired bodies 31 and 32 so that two contact holding members 70a make contact with both end faces of the four pieces of honeycomb fired bodies 31 and 32, and then firmly sandwich and hold the honeycomb fired bodies in such a manner that the curved portion of the contact holding members 70a tightly fit the inner surface of the cylindrical container 18 (see FIG. 7B). Since a contact face of the contact holding member 70a has a plane face, the end faces of the honeycomb fired bodies 31 and 32 are aligned in the same plane.

Figure 7C:
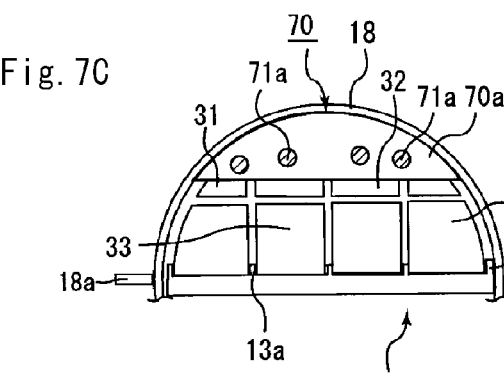

Then, the mounting member 10 is moved to another place, and the mounting member 12 having a mounting face 12a on which the four pieces of honeycomb fired bodies 32 and 33 are placed is moved to a predetermined position in the cylindrical container 18 under the honeycomb fired bodies 31 and 32 held by the holding member 70 and fixed (see FIG. 7C).

Next, other holding members 72 disposed in the neighborhood of the cylindrical container 18 extend to reach both end faces of the honeycomb fired bodies 32 and 33, and make contact with the both end faces of the honeycomb fired bodies 32 and 33; and then firmly sandwich and hold the honeycomb fired bodies in such a manner that the curved portions (curved portions on the left and right sides in FIG. 7D) of the contact holding member 72a tightly fit the inner surface of the cylindrical container 18.

Figure 7D:
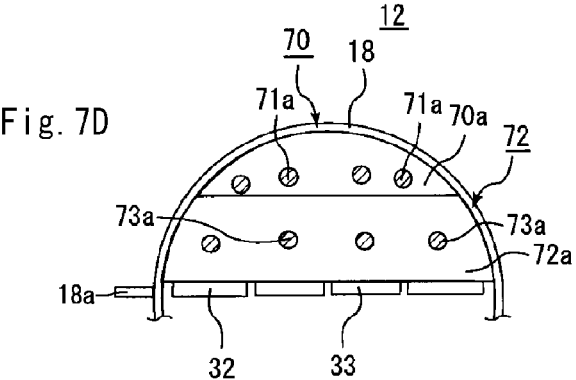

In this case, the holding members 72 hold the honeycomb fired bodies 32 and 33 in such a manner that the end faces of the eight pieces of honeycomb fired bodies 31 to 33 are aligned in the same plane (see FIG. 7D).

Figure 8A:
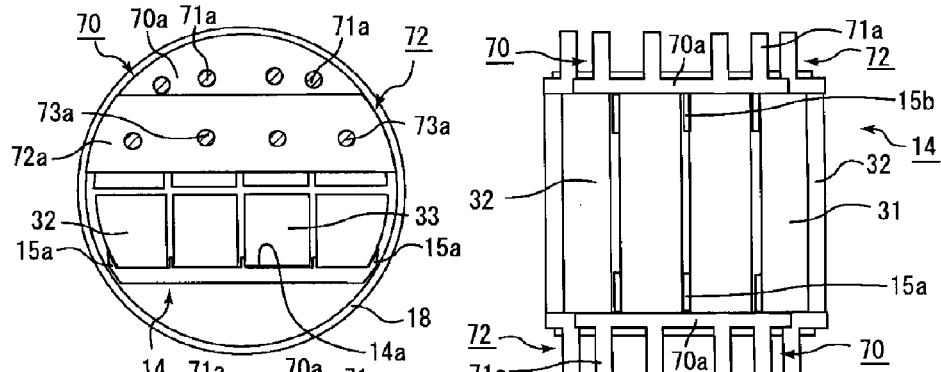
FIGS. 8A to 8D are vertical cross-sectional views and plan views schematically showing a holding step and an injecting step in the manufacture of a honeycomb structure according to the third embodiment of the present invention.

Then, the mounting member 12 is moved to another place in the same manner as mentioned above, and the mounting member 14 having a mounting face 14a on which four pieces of honeycomb fired bodies 32 and 33 are placed is conveyed to a predetermined position in the cylindrical container 18 under the honeycomb fired bodies 31 to 33 held by the holding member 70 and 72, and fixed (see FIG. 8A).

Figure 8B:
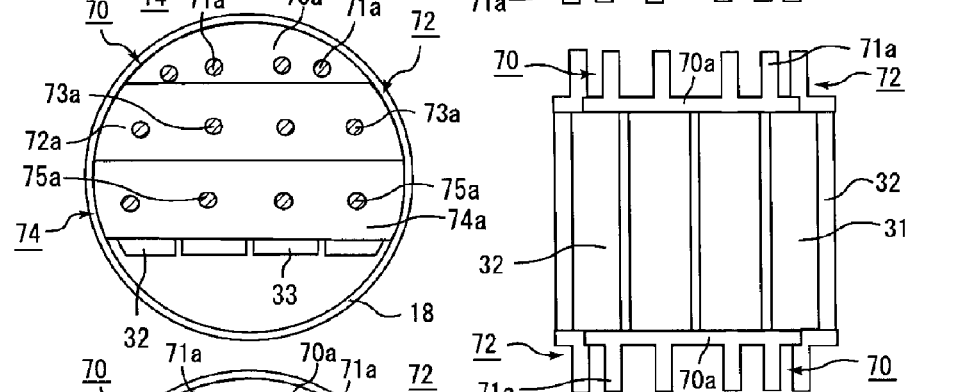

Next, other holding members 74 disposed in the neighborhood of the cylindrical container 18 extend to reach both end faces of the honeycomb fired bodies 32 and 33, and make contact with the both end faces of the honeycomb fired bodies 32 and 33, and then firmly sandwich and hold the honeycomb fired bodies 32 and 33 from the both end faces thereof in such a manner that the curved portions (curved portions on the left and right sides in FIG. 8B) of the contact holding members 74a tightly fit the inner surface of the cylindrical container 18 (see FIG. 8B).

In this case, the holding members 74 hold the honeycomb fired bodies 32 and 33 in such a manner that the end faces of the 12 pieces of honeycomb fired bodies 31 to 33 are aligned in the same plane.

Figure 8C:
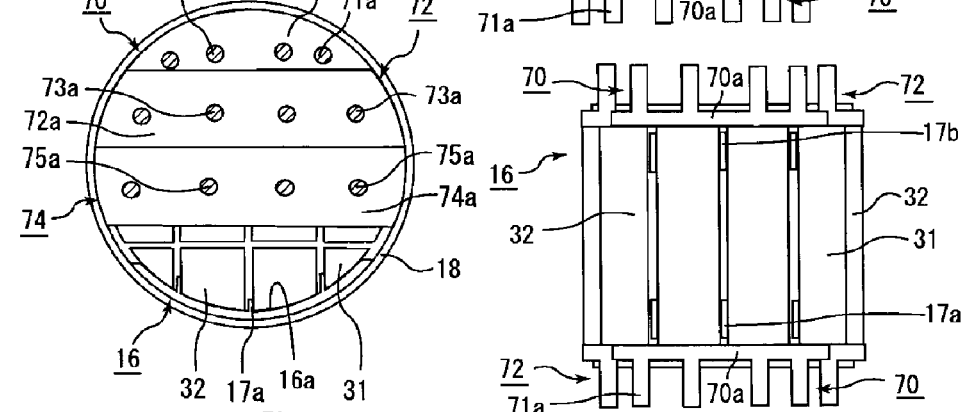

Next, the mounting member 16 having a mounting face 16a on which four pieces of honeycomb fired bodies 31 and 32 are placed is conveyed to a predetermined position under the honeycomb fired bodies 31 to 33 held by the holding member 70, 72, and 74, and fixed (see FIG. 8C).

Next, other holding members 76 disposed in the neighborhood of the cylindrical container 18 extend to reach both end faces of the honeycomb fired bodies 31 and 32, and make contact with the both end faces of the honeycomb fired bodies 31 and 32, and then firmly sandwich and hold the honeycomb fired bodies in such a manner that the curved portions (curved portions on the left and right sides in FIG. 8D) of the contact holding members 76a tightly fit the inner surface of the cylindrical container 18.

Figure 8D:
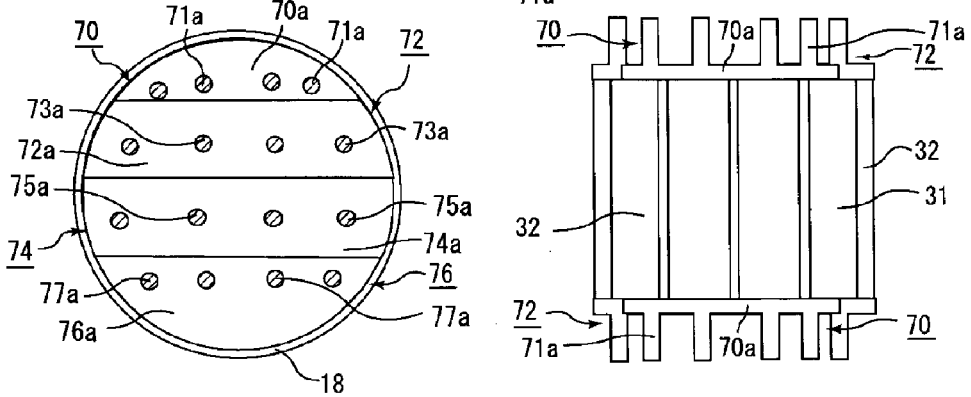

In this case, the holding members 76 hold the honeycomb fired bodies 31 and 32 in such a manner that the end faces of the 16 pieces of honeycomb fired bodies 31 to 33 are aligned in the same plane (see FIG. 8D).

In the present embodiment, since the holding members 76 also function as the end face adhering member 40 used in the first embodiment (see FIG. 4A), a step of placing the end face adhering member 40 shown in FIG. 4A can be omitted. Thereafter, as in the first embodiment, the paste for adhesion and sealing is injected through an injection pipe 18a, and drying of the paste for adhesion and sealing is performed, thereby completing the manufacture of the honeycomb structure body 30.

In the method of manufacturing a honeycomb structure according to the third embodiment, the same operations and effects as those of the first embodiment can be enjoyed.

Other Embodiments

The shape of a honeycomb structure manufactured by the methods of manufacturing a honeycomb structure according to the embodiment of the present invention is not limited to the round pillar shape shown in FIG. 4B, and the shape may be an optional pillar shape such as cylindroid shape and polygonal pillar shape.

Also, the number of the honeycomb fired bodies forming the honeycomb structure is not limited to 16 pieces as in the above-mentioned embodiments, and the number may be more or less than 16 pieces.

A porosity of a honeycomb structure manufactured by the method of the embodiment of the present invention is preferably at least about 30% and at most about 70%.

This is because, strength of the honeycomb structure tends to be maintained, and a resistance when exhaust gases pass through the cell wall tends to be kept low.

On the other hand, in the case where the porosity is less than about 30%, the cell wall tends to be clogged in an early stage, whereas in the case where the porosity is more than about 70%, the strength of the honeycomb structure is deteriorated so that the honeycomb structure may be easily broken.

Here, the porosity can be measured by the conventionally known methods such as mercury porosimetry method, an Archimedes' method, a measuring method using a scanning electron microscope (SEM).

A cell density on a cross section perpendicular to the longitudinal direction of the honeycomb structure is not particularly limited, and a preferable lower limit is about 31.0 pcs/cm2 (about 200.0 pcs/in2), a preferable upper limit is about 93.0 pcs/cm2 (about 600.0 pcs/in2), a more preferable lower limit is about 38.8 pcs/cm2 (about 250.0 pcs/in2), and a more preferable upper limit is about 77.5 pcs/cm2 (about 500.0 pcs/in2).

The main component of the constituent materials of the honeycomb fired body which constitutes the honeycomb structure is not limited to silicon carbide, and examples of other ceramic materials include nitride ceramics such as aluminum nitride, silicon nitride, boron nitride, and titanium nitride; carbide ceramics such as zirconium carbide, titanium carbide, tantalum carbide, and tungsten carbide; a composite of a metal and a nitride ceramic; a composite of a metal and a carbide ceramic; and the like.

Moreover, the examples of the constituent materials further include ceramic materials such as silicon-containing ceramics formed by mixing metal silicon to the above-mentioned ceramics, and ceramics coupled by silicon or a silicate compound.

The main component of the constituent materials of the honeycomb fired body is particularly preferably silicon carbide.

This is because, silicon carbide is superior in heat resistance, mechanical strength, thermal conductivity, and the like.

Moreover, compounds formed by mixing metal silicon to silicon carbide (silicon-containing silicon carbide) are also preferable.

An average particle diameter of a silicon carbide powder in the wet mixture is not particularly limited, and a silicon carbide powder which tends not to cause the case where a size of the honeycomb structure manufactured by the following firing treatment becomes smaller than that of a degreased honeycomb molded body is preferable. For example, a silicon carbide powder containing 100 parts by weight of a powder having an average particle diameter of at least about 1.0 μm and at most about 50.0 μm and at least about 5 parts by weight and at most about 65 parts by weight of a powder having an average particle diameter of at least about 0.1 μm and at most about 1.0 μm is preferable.

An organic binder used upon preparing the wet mixture is not particularly limited, and examples thereof include carboxymethyl cellulose, hydroxyethyl cellulose, polyethylene glycol, and the like. Out of those examples, methyl cellulose is preferable. Normally, a blending amount of the organic binder is preferably at least about 1 part by weight and at most about 10 parts by weight relative to 100 parts by weight of a ceramic powder.

A plasticizer and a lubricant used upon preparing the wet mixture are not particularly limited, and examples of the plasticizer include glycerin, and the like. Examples of the lubricant include polyoxyalkylene-based compounds such as polyoxyethylene alkyl ether and polyoxypropylene alkyl ether, and the like.

The specific examples of the lubricant include polyoxyethylene monobutyl ether, polyoxypropylene monobutyl ether, and the like.

Here, depending on the case, a plasticizer and a lubricant may not be contained in the wet mixture.

Also, a dispersion medium may be used upon preparing the wet mixture, and examples thereof include water, an organic solvent such as benzene, alcohol such as methanol, and the like.

Moreover, a forming auxiliary may be added to the wet mixture.

The forming auxiliary is not particularly limited, and examples thereof include ethylene glycol, dextrin, fatty acid, fatty acid soap, polyalcohol, and the like.

Furthermore, a pore-forming agent such as balloons that are fine hollow spheres including oxide-based ceramics, spherical acrylic particles, and graphite may be added to the wet mixture as needed.

The balloons are not particularly limited, and examples thereof include alumina balloons, glass micro balloons, shirasu balloons, fly ash balloons (FA balloons), mullite balloons, and the like. Alumina balloons are preferable among these.

Moreover, a content of organic components in the wet mixture is preferably about 10% by weight or less, and a content of water is preferably at least about 8% by weight and at most about 30% by weight.

A plug material paste for sealing the cells is not particularly limited, and a plug material paste that makes a porosity of plugs manufactured through the following steps at least about 30% and at most about 75% is preferable. For example, a plug material paste that has the same composition as the wet mixture can be used.

Examples of an inorganic binder in the paste for adhesion and sealing include silica sol, alumina sol, and the like.

Each of these may be used alone, or two or more kinds of these may be used in combination. Silica sol is preferable among these inorganic binders.

Examples of an organic binder in the paste for adhesion and sealing include polyvinyl alcohol, methyl cellulose, ethyl cellulose, carboxymethyl cellulose, and the like. Each of these may be used alone, or two or more kinds of these may be used in combination. Carboxymethyl cellulose is preferable among these organic binders.

Examples of inorganic fibers in the paste for adhesion and sealing include ceramic fibers such as silica-alumina, mullite, alumina and silica, and the like. Each of these may be used alone, or two or more kinds of these may be used in combination. Alumina fibers are preferable among these inorganic fibers.

Examples of inorganic particles in the paste for adhesion and sealing include carbides, nitrides, and the like. More specifically, the examples thereof include an inorganic powder including a substance such as silicon carbide, silicon nitride, and boron nitride. Each of these may be used alone, or two or more kinds of these may be used in combination. Silicon carbide is preferable among these inorganic particles due to its superior thermal conductivity.

Furthermore, a pore-forming agent such as balloons that are fine hollow spheres including oxide-based ceramics, spherical acrylic particles, and graphite may be added to the paste for adhesion and sealing as needed. The balloons are not particularly limited, and examples thereof include alumina balloons, glass micro balloons shirasu balloons, fly ash balloons (FA balloons), mullite balloons, and the like. Out of those examples, alumina balloons are preferable.

A catalyst may be supported on the honeycomb structure. It is preferable that the catalyst be supported on a surface of a catalyst supporting layer which is formed on a surface of and/or inside the cell wall.

As a material forming a catalyst supporting layer, those materials with high specific surface area, which can support a catalyst in a highly dispersed state are preferable, and examples thereof include oxide ceramics such as alumina, titania, zirconia, and silica.

Those materials may be used alone, or in combination of two or more kinds of them.

Out of those examples, a material having a high specific surface area of about 250 m2/g or more is preferable, and γ-alumina is particularly preferable.

A method of forming the catalyst supporting layer including the above-mentioned alumina is not particularly limited, and a method including impregnating a honeycomb structure with a metal compound solution containing aluminum such as a water solution of aluminum nitrate; forming an alumina film on a cell wall by a sol-gel method; drying and firing the honeycomb structure can be used.

Preferable examples of a catalyst supported on a surface of the catalyst supporting layer include noble metals such as platinum, palladium, rhodium, and the like, and platinum is more preferable among these. Also, alkali metals such as potassium and sodium, alkaline-earth metals such as barium and their oxides, and an oxide catalyst can be used as other catalysts. Those catalysts may be used alone, or in combination of two or more kinds of them.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A honeycomb structure comprising a ceramic block formed by bonding a plurality of pillar-shaped honeycomb fired bodies by interposing an adhesive layer therebetween, and a sealing material layer provided on the periphery of the ceramic block, each of said honeycomb fired bodies having a large number of cells disposed in parallel with one another in a longitudinal direction with a cell wall therebetween, wherein said adhesive layer and said sealing material layer are integrally formed with no interface to divide the two layers, wherein both of said adhesive layer and said sealing material layer contain inorganic fibers, and wherein at least one inorganic fiber extends from said adhesive layer to said sealing layer.

2. The honeycomb structure according to claim 1, wherein both of said adhesive layer and said sealing material layer contain an inorganic binder.

3. The honeycomb structure according to claim 1, wherein either one end portion of each of said large number of cells is sealed with a plug.

4. The honeycomb structure according to claim 1, wherein said honeycomb structure is formed by a plurality of kinds of honeycomb fired bodies having a different shape.

5. The honeycomb structure according to claim 4, wherein said honeycomb fired body has side faces formed by two plane faces and one curved face, side faces formed by three plane faces and one curved face, or side faces formed by four plane faces.

6. The honeycomb structure according to claim 1, wherein both end faces of said cell are not sealed with a plug.

7. The honeycomb structure according to claim 1, wherein a constituting material of said honeycomb fired body comprises silicon carbide or silicon-containing silicon carbide.

8. The honeycomb structure according to claim 1, wherein a catalyst is supported on said honeycomb structure.

9. The honeycomb structure according to claim 1, wherein the honeycomb structure is produced by simultaneously carrying out a bonding step to bond said honeycomb fired bodies by interposing the adhesive layer therebetween and a sealing material layer-forming step to form the sealing material layer on the periphery of the ceramic block.

10. The honeycomb structure according to claim 9, wherein the honeycomb structure is produced by further carrying out:

a holding step including positioning of a plurality of said honeycomb fired bodies at predetermined positions in a cylindrical container and holding of both end faces of the honeycomb fired bodies to form a honeycomb aggregated body in which the honeycomb fired bodies are disposed with predetermined intervals between them;

an injecting step to fill a paste for adhesion and sealing into inner portions and the periphery of said honeycomb aggregated body; and a drying step to dry to solidify said paste for adhesion and sealing to be made into an adhesive layer and a sealing material layer.

11. The honeycomb structure according to claim 10, wherein the honeycomb structure is produced by further carrying out a fixing step including conveying a mounting member on which said honeycomb fired bodies have been placed, into inside of a cylindrical container, and fixing said mounting member at a predetermined position.

12. The honeycomb structure according to claim 11, wherein said mounting member has a mounting face on which protruding portions for positioning are installed at four corners of each of said honeycomb fired bodies which are placed in parallel with one another in the longitudinal direction on the mounting face, or a mounting face on which groove portions for positioning are formed.

13. The honeycomb structure according to claim 12,
wherein said mounting member for mounting said honeycomb fired bodies having a curved side face has the mounting face having the same shape as that of the curved side faces of the honeycomb fired bodies, and
wherein the honeycomb structure is produced by placing said honeycomb fired bodies with the curved side faces facing down so as to fit the mounting face of said mounting member having the curved shape.

14. The honeycomb structure according to claim 10, wherein in said holding step, the honeycomb structured body is produced by making holding members extend to reach both end faces of said honeycomb fired body, make contact with both end faces of said honeycomb fired body, and then firmly sandwich and hold said honeycomb fired body from the both end faces.

15. The honeycomb structure according to claim 14, wherein said holding members are configured to hold a plurality of said honeycomb fired bodies collectively by making contact with the end faces of said plurality of honeycomb fired bodies.

16. The honeycomb structure according to claim 10,
wherein an end-face adhering member is attached firmly to said cylindrical container and said honeycomb aggregated body on both sides thereof so as to seal gap portions between said cylindrical container and said honeycomb aggregated body, and
wherein the honeycomb structure is produced by injecting said paste for adhesion and sealing.

17. The honeycomb structure according to claim 10,
wherein said cylindrical container is configured to be divided, and
wherein the honeycomb structure is produced by dividing said cylindrical container.

18. The honeycomb structure according to claim 17, wherein the honeycomb structure is produced by:
dividing said cylindrical container to take out said honeycomb aggregated body after said paste for adhesion and sealing is hardened by heating treatment, and
drying said paste for adhesion and sealing at a predetermined temperature.

19. The honeycomb structure according to claim 10, wherein said paste for adhesion and sealing comprises an inorganic binder, an organic binder, and at least one of an inorganic fiber and an inorganic particle.

20. The honeycomb structure according to claim 9, wherein the honeycomb structure is produced by:
further forming a honeycomb aggregated body by positioning a plurality of said honeycomb fired bodies at predetermined positions and holding both end faces thereof with holding members;
filling a paste for adhesion and sealing in a cylindrical container by using said cylindrical container and end-face adhering members; and
heating said paste for adhesion and sealing.

21. The honeycomb structure according to claim 20, wherein the honeycomb structure is produced by making holding members extend to reach both end faces of said honeycomb fired body, make contact with both end faces of said honeycomb fired body, and then firmly sandwich and hold said honeycomb fired body from the both end faces.

22. The honeycomb structure according to claim 20, wherein said holding members are configured to hold a plurality of said honeycomb fired bodies collectively by making contact with the end faces of said plurality of honeycomb fired bodies.

23. The honeycomb structure according to claim 20,
wherein said cylindrical container is configured to be divided, and
wherein the honeycomb structure is produced by dividing said cylindrical container.

24. The honeycomb structure according to claim 23, wherein the honeycomb structure is produced by:
dividing said cylindrical container to take out said honeycomb aggregated body after said paste for adhesion and sealing is hardened to some extent by heating treatment, and
drying said paste for adhesion and sealing at a predetermined temperature.

25. The honeycomb structure according to claim 20, wherein said paste for adhesion and sealing comprises an inorganic binder, an organic binder, and at least one of an inorganic fiber and an inorganic particle.

* * * * *

UNITED STATES PATENT AND TRADEMARK OFFICE
CERTIFICATE OF CORRECTION

Page 1 of 1

PATENT NO. : 7,871,688 B2
APPLICATION NO. : 12/107631
DATED : January 18, 2011
INVENTOR(S) : Kazushige Ohno et al.

It is certified that error appears in the above-identified patent and that said Letters Patent is hereby corrected as shown below:

Column 20, Line 9, the line should read as follows:
sive layer to said sealing material layer.

Signed and Sealed this
Third Day of May, 2011

David J. Kappos
*Director of the United States Patent and Trademark Office*